(12) United States Patent
Yang et al.

(10) Patent No.: US 10,877,968 B2
(45) Date of Patent: Dec. 29, 2020

(54) SYSTEMS AND METHODS FOR DATA PROCESSING

(71) Applicant: BEIJING DIDI INFINITY TECHNOLOGY AND DEVELOPMENT CO., LTD., Beijing (CN)

(72) Inventors: Wenjun Yang, Beijing (CN); Zang Li, Beijing (CN); Zhihua Chang, Beijing (CN); Hongbo Ling, Beijing (CN); LiFeng Cao, Beijing (CN); Fan Yang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/703,965

(22) Filed: Dec. 5, 2019

(65) Prior Publication Data

US 2020/0110749 A1    Apr. 9, 2020

Related U.S. Application Data

(63) Continuation of application No. PCT/CN2018/089141, filed on May 31, 2018.

(30) Foreign Application Priority Data

Jun. 5, 2017    (CN) .......................... 2017 1 0414760

(51) Int. Cl.
*G06F 16/00*    (2019.01)
*G06F 16/2453*    (2019.01)
*G06F 16/2455*    (2019.01)

(52) U.S. Cl.
CPC .. *G06F 16/24539* (2019.01); *G06F 16/24552* (2019.01)

(58) Field of Classification Search
CPC ..................... G06F 16/24539; G06F 16/24662
(Continued)

(56) References Cited

U.S. PATENT DOCUMENTS

| 6,122,628 A | 9/2000 | Castelli et al. |
| 2007/0299865 A1 | 12/2007 | Nakano et al. |

(Continued)

FOREIGN PATENT DOCUMENTS

| CN | 102819616 B | 9/2015 |
| CN | 104915450 A | 9/2015 |
| TW | 201506839 A | 2/2015 |

OTHER PUBLICATIONS

International Search Report in PCT/CN2018/089141 dated Sep. 7, 2018, 4 pages.
Written Report in PCT/CN2018/089141 dated Sep. 7, 2018, 5 pages.

*Primary Examiner* — Monica M Pyo
(74) *Attorney, Agent, or Firm* — Metis IP LLC

(57) ABSTRACT

A method for querying data is provided. The method may include determining a characteristic value of a selected feature dimension among feature values of the selected feature dimension of plurality of entities and establishing a corresponding relationship between the characteristic value and the selected feature dimension. The method may also include caching the corresponding feature value into a cache memory for each entity having a feature value of the selected feature dimension being unequal to the characteristic value, and leaving the corresponding feature value without caching for each entity having a feature value of the selected feature dimension being equal to the characteristic value. The method may further include performing a first search in the (Continued)

cache memory to produce a first search result in response to a query request related to the plurality of entities, and generating a query result based on the corresponding relationship and the first search result.

20 Claims, 13 Drawing Sheets

(58) Field of Classification Search
USPC .......................................................... 707/715
See application file for complete search history.

(56) References Cited

U.S. PATENT DOCUMENTS

| | | | |
|---|---|---|---|
| 2008/0208621 A1 | 8/2008 | Karkanias et al. | |
| 2009/0024598 A1* | 1/2009 | Xie | G06F 16/3349 |
| 2009/0172024 A1 | 7/2009 | Hsu et al. | |
| 2013/0282650 A1* | 10/2013 | Zhang | G06F 16/283 |
| | | | 707/605 |
| 2013/0318069 A1* | 11/2013 | Alu | G06F 16/24524 |
| | | | 707/718 |
| 2015/0356182 A1* | 12/2015 | Ivershen | H04L 67/1095 |
| | | | 707/723 |
| 2016/0171074 A1 | 6/2016 | Cai et al. | |
| 2017/0017683 A1* | 1/2017 | Fourny | G06F 16/2272 |
| 2017/0039483 A1 | 2/2017 | Cheng et al. | |
| 2019/0173970 A1 | 6/2019 | Zhong et al. | |

* cited by examiner

100

| 101 | For each feature dimension i of an original data set, selecting a characteristic value Mi from a plurality of feature values of the feature dimension i, and recording a corresponding relationship between each feature dimension i and the corresponding characteristic value Mi |

↓

| 102 | For each feature dimension i of the original data set, caching feature value(s) of the feature dimension i other than the corresponding characteristic value Mi into a cache memory |

↓

| 103 | Performing a search in the cache memory in response to a query request |

↓

| 104 | Replacing one or more feature values that are null in the cache memory by the corresponding characteristic value(s) Mi based on the query request and the recorded corresponding relationship(s), and generating a query result based on the replacement result |

```
┌─────────────────────────────────────────────────────────┐
│ For each feature dimension i of an original data set,   │
│ determining a feature value with the largest distribution│ ~201
│ proportion among a plurality of feature values of the   │
│ feature dimension i as a characteristic value Mi, and   │
│ recording a corresponding relationship between each     │
│ feature dimension i and the corresponding characteristic│
│ value Mi                                                │
└─────────────────────────────────────────────────────────┘
                            ↓
┌─────────────────────────────────────────────────────────┐
│ For each feature dimension i of the original data set,  │
│ caching feature value(s) of the feature dimension i     │ ~202
│ other than the corresponding characteristic value Mi    │
│ into a cache memory                                     │
└─────────────────────────────────────────────────────────┘
                            ↓
┌─────────────────────────────────────────────────────────┐
│ Performing a search in the cache memory in response to  │ ~203
│ a query request                                         │
└─────────────────────────────────────────────────────────┘
                            ↓
┌─────────────────────────────────────────────────────────┐
│ Replacing one or more feature values that are null in   │
│ the cache memory by the corresponding characteristic    │
│ value(s) Mi based on the query request and the recorded │ ~204
│ corresponding relationship(s), and generating a query   │
│ result based on the replacement result                  │
└─────────────────────────────────────────────────────────┘
                            ↓
┌─────────────────────────────────────────────────────────┐
│ Updating the original data set                          │ ~205
└─────────────────────────────────────────────────────────┘
                            ↓
┌─────────────────────────────────────────────────────────┐
│ Updating a distribution proportion of each feature value│ ~206
│ of the feature dimension i based on the updated original│
│ data set                                                │
└─────────────────────────────────────────────────────────┘
                            ↓
┌─────────────────────────────────────────────────────────┐
│ Updating the characteristic value Mi based on the       │ ~207
│ updated distribution proportion(s) of feature value(s)  │
│ in the feature dimension i                              │
└─────────────────────────────────────────────────────────┘
                            ↓
┌─────────────────────────────────────────────────────────┐
│ Updating the corresponding relationship between i and Mi│ ~208
│ based on the updated characteristic value Mi            │
└─────────────────────────────────────────────────────────┘
```

301 — For each feature dimension i of an original data set, selecting a characteristic value Mi from a plurality of feature values of the feature dimension i, and recording a corresponding relationship between each feature dimension i and the corresponding characteristic value Mi

302 — For each feature dimension i of the original data set, caching feature value(s) of the feature dimension i other than the corresponding characteristic value Mi into a cache memory

303 — In response to a query request, determining whether the query request includes a query condition that includes i and Mi based on the mapping relationship(s)

Y

304 — Replacing the characteristic value Mi in the query condition of the query request by a null value, and performing a search in the cache memory based on the updated query request

305 — Generating a query result based on a search result of the search in the cache memory

For each feature dimension i of an original data set, selecting a characteristic value Mi from a plurality of feature values of the feature dimension i, and recording a corresponding relationship between each feature dimension i and the corresponding characteristic value Mi — 401

For each feature dimension i of the original data set, caching feature value(s) of the feature dimension i other than the corresponding characteristic value Mi into a cache memory — 402

In response to a query request, replacing null feature value(s) in the cache memory by the corresponding characteristic value(s) Mi based on the corresponding relationship(s), and performing a search in the cache memory based on the query request — 403

Generating a query result based on a search result of the search in the cache memory — 404

```
┌─────────────────────────────────────────────────────────┐
│ For each feature dimension i of an original data set,   │
│ selecting a characteristic value Mi from a plurality of │──501
│ feature values of the feature dimension i, and recording│
│ a corresponding relationship between each feature       │
│ dimension i and the corresponding characteristic value Mi│
└─────────────────────────────────────────────────────────┘
                            ↓
┌─────────────────────────────────────────────────────────┐
│ For each feature dimension i of the original data set,  │
│ caching feature value(s) of the feature dimension i     │──502
│ other than the corresponding characteristic value Mi    │
│ into a cache memory                                     │
└─────────────────────────────────────────────────────────┘
                            ↓
         ◇ In response to a query request,
           determining whether the query request ◇──503
           includes a query condition that includes i
           based on the recorded corresponding
           relationship
                            ↓
┌─────────────────────────────────────────────────────────┐
│ Replacing null feature value(s) corresponding to the    │
│ feature dimension i in the cache memory by the          │──504
│ corresponding characteristic value(s) Mi, and performing│
│ a search in the cache memory based on the query request │
└─────────────────────────────────────────────────────────┘
                            ↓
┌─────────────────────────────────────────────────────────┐
│ Generating a query result based on a search result of   │──505
│ the search in the cache memory                          │
└─────────────────────────────────────────────────────────┘
```

FIG. 5

SYSTEMS AND METHODS FOR DATA PROCESSING

CROSS-REFERENCE TO RELATED APPLICATIONS

This application is a Continuation of International Application No. PCT/CN2018/089141, filed on May 31, 2018, which claims priority of Chinese Application No. 201710414760.0, filed on Jun. 5, 2017, the contents of which are expressly incorporated herein by reference in their entirety.

TECHNICAL FIELD

The present disclosure generally relates to systems and methods for data processing, and in particular, to systems and methods for caching data.

BACKGROUND

In internet technologies, a service system often needs to store and process an ever-increasing amount of data, such as feature information of millions of users. In order to facilitate the speed of data querying and processing, the service system often utilizes a cache memory to store information that is frequently used by the processor of the service system. The cache memory is a high-speed memory that the processor can access more quickly than it accesses other regular storage devices, such as hard disks. However, the size of cache memory is often relatively small compared with regular storage devices. Thus, it is desirable to develop systems and methods for caching data more efficiently, thus improving data processing and computer functions.

SUMMARY

In one aspect of the present disclosure, a system for querying data is provided. The system may include at least one storage medium, a cache memory for storing data, and at least one processor in communication with the at least one storage medium and the cache memory. The at least one storage medium may include a set of instructions and feature information of a plurality of entities. The feature information may include at least one feature dimension for each entity and at least one feature value for each feature dimension. When executing the set of instructions, the at least one processor may be configured to direct the system to determine a characteristic value of a selected feature dimension among the feature values of the selected feature dimension of the plurality of entities and establish a corresponding relationship between the characteristic value and the selected feature dimension. For each entity having a feature value of the selected feature dimension being unequal to the characteristic value, the at least one processor may be configured to direct the system to cache the corresponding feature value of the selected feature dimension into the cache memory. For each entity having a feature value of the selected feature dimension being equal to the characteristic value, the at least one processor may be configured to direct the system to leave the corresponding feature value of the selected feature dimension without caching. In response to a query request related to the plurality of entities, the at least one processor may be further configured to direct the system to perform a first search in the cache memory to produce a first search result. The at least one processor may be further configured to direct the system to generate a query result based on the corresponding relationship and the first search result.

In some embodiments, to determine the characteristic value of the selected feature dimension, the at least one processor may be further configured to direct the system to determine a mode of the feature values of the selected feature dimension of plurality of entities as the characteristic value of the selected feature dimension.

In some embodiments, the at least one processor may be further configured to direct the system to update the feature information of the plurality of entities in the at least one storage medium, and determine an updated characteristic value of the selected feature dimension based on the updated feature information.

In some embodiments, to generate the query result, the at least one processor may be further configured to direct the system to replace one or more empty returns for the selected feature dimension in the first search result with the characteristic value.

In some embodiments, to generate the query result, the at least one processor may be further configured to direct the system to determine whether the first search result includes an empty return. In response to a determination that the first search result includes an empty return, the at least one processor may be further configured to direct the system to cache the characteristic value of the selected feature dimension into the cache memory based on the corresponding relationship for each entity whose selected feature dimension having an empty entry. The at least one processor may be further configured to direct the system to perform a second search in the cache memory in response to the query request to produce a second search result, and generate the query result based on the second search result.

In some embodiments, to perform the first search in the cache memory in response to the query request, the at least one processor may be further configured to direct the system to determine whether the query request is related to the selected feature dimension and the corresponding characteristic value. In response to a determination that the query request is related to the selected feature dimension and the corresponding characteristic value, the at least one processor may be further configured to direct the system to update the query request. The updated query request may include the feature dimension and an empty entry. The at least one processor may be further configured to direct the system to perform the first search in the cache memory based on the updated query request.

In some embodiments, to perform the first search in the cache memory in response to the query request, the at least one processor may be further configured to direct the system to determine whether the query request is related to the selected feature dimension. In response to a determination that the query request is related to the selected feature dimension, the at least one processor may be further configured to direct the system to cache the characteristic value of the selected feature dimension into the cache memory for each entity whose selected feature dimension has an empty entry. The at least one processor may be further configured to direct the system to perform the first search in the cache memory in response to the query request.

In some embodiments, to perform the first search in the cache memory in response to the query request, the at least one processor may be further configured to direct the system to cache the characteristic value of the selected feature dimension into the cache memory for each entity whose selected feature dimension has an empty entry and perform the first search in the cache memory in response to the query request.

In some embodiments, the plurality of entities may include at least one of service requesters, service providers, or service orders in an Online to Offline (O2O) service system.

In another aspect of the present disclosure, a method is provided. The method may be implemented on a computing device having at least one processor, at least one storage medium, a cache memory, and a communication platform connected to a network. The at least one storage medium may include feature information of a plurality of entities. The feature information may include at least one feature dimension for each entity and at least one feature value for each feature dimension. The method may include determining a characteristic value of a selected feature dimension among the feature values of the selected feature dimension of the plurality of entities and establishing a corresponding relationship between the characteristic value and the selected feature dimension. The method may also include caching the corresponding feature value of the selected feature dimension into the cache memory for each entity having a feature value of the selected feature dimension being unequal to the characteristic value. The method may further include leaving the corresponding feature value of the selected feature dimension without caching for each entity having a feature value of the selected feature dimension being equal to the characteristic value. The method may further include performing a first search in the cache memory to produce a first search result in response to a query request related to the plurality of entities. The method may further include generating a query result based on the corresponding relationship and the first search result.

In another aspect of the present disclosure, a non-transitory computer-readable storage medium embodying a computer program product is provided. The computer program product comprising instructions may be configured to cause a computing device to determine a characteristic value of a selected feature dimension among a plurality of feature values of the selected feature dimension of a plurality of entities and establish a corresponding relationship between the characteristic value and the selected feature dimension. The computer program product comprising instructions may be further configured to cause the computing device to cache the corresponding feature value of the selected feature dimension into a cache memory for each entity having a feature value of the selected feature dimension being unequal to the characteristic value. The computer program product comprising instructions may be further configured to cause the computing device to leave the corresponding feature value of the selected feature dimension without caching for each entity having a feature value of the selected feature dimension being equal to the characteristic value. The computer program product comprising instructions may be further configured to cause the computing device to perform a first search in the cache memory to produce a first search result in response to a query request related to the plurality of entities. The computer program product comprising instructions may be further configured to cause the computing device to generate a query result based on the corresponding relationship and the first search result Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a flowchart illustrating an exemplary process for data processing according to some embodiments of the present disclosure;

FIG. 2 is a flowchart illustrating an exemplary process for data processing according to some embodiments of the present disclosure;

FIG. 3 is a flowchart illustrating an exemplary process for data processing according to some embodiments of the present disclosure;

FIG. 4 is a flowchart illustrating an exemplary process for data processing according to some embodiments of the present disclosure;

FIG. 5 is a flowchart illustrating an exemplary process for data processing according to some embodiments of the present disclosure;

DETAILED DESCRIPTION

Figure 6:
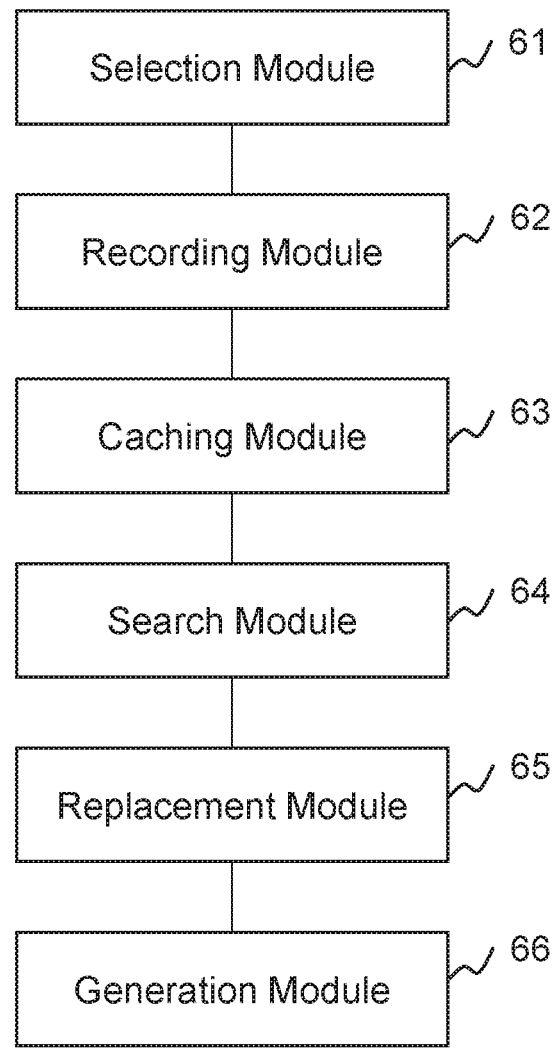
FIG. 6 is a block diagram illustrating an exemplary data processing device according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Embodiments of the present disclosure may be applied to different transportation systems including but not limited to land transportation, sea transportation, air transportation, space transportation, or the like, or any combination thereof. A vehicle of the transportation systems may include a rickshaw, travel tool, taxi, chauffeured car, hitch, bus, rail transportation (e.g., a train, a bullet train, high-speed rail, and subway), ship, airplane, spaceship, hot-air balloon, driverless vehicle, or the like, or any combination thereof. The transportation system may also include any transportation system that applies management and/or distribution, for example, a system for sending and/or receiving an express.

The application scenarios of different embodiments of the present disclosure may include but not limited to one or more web pages, browser plugins and/or extensions, client terminals, custom systems, intracompany analysis systems, artificial intelligence robots, or the like, or any combination thereof. It should be understood that application scenarios of the system and method disclosed herein are only some examples or embodiments. Those having ordinary skills in the art, without further creative efforts, may apply these drawings to other application scenarios.

It should be understood that, although items, such as "first" "second" and "third" may be used to describe various kinds of information in the present application, the information may be described by any other term. The terms are only used to distinguish different information from each other. For example, first information may also be referred to as second information without departing from the scope of the present application. Similarly, second information may also be referred to as first information. The term "if" may refer to "when" or "in response to a determination".

The present disclosure relates to systems and methods for data processing. The systems may include a storage medium, a cache memory, and a processor. The storage medium may store feature information of a plurality of entities. The feature information may include feature values of one or more feature dimensions of each entity. The cache memory may be a high-speed memory that the processor can access more quickly than it accesses the storage medium. In order to better utilize the cache memory, the processor may select a portion of the feature information and cache the selected portion into the cache memory instead of caching all the feature information into the cache memory. For example, the processor may determine a characteristic value of a selected feature dimension among the feature values of the selected feature dimension of the entities. For each entity whose feature value of the selected feature dimension is unequal to the characteristic value, the processor may cache the corresponding feature value of the selected feature dimension into the cache memory. For each entity whose feature value of the selected feature dimension is equal to the characteristic value, the processor may leave the corresponding feature value of the selected feature dimension without caching. When receiving a query request, the processor may perform a search in the cache memory and generate a query result based on the search result and a corresponding relationship between the selected feature dimension and the characteristic value. In this way, the amount of data cached into the cache memory may be reduced without losing information.

Some embodiments of the present disclosure will be described below in detail with reference to the following drawings. The embodiments and features in the embodiments described below may be combined with each other.

FIG. 1 is a flowchart illustrating an exemplary process for data processing according to some embodiments of the present disclosure. In some embodiments, the process 100 may be implemented on an electronic device (e.g., a smartphone, a tablet, a personal computer). The process 100 may be applied to a data set including at least one feature dimension.

Figure 11:
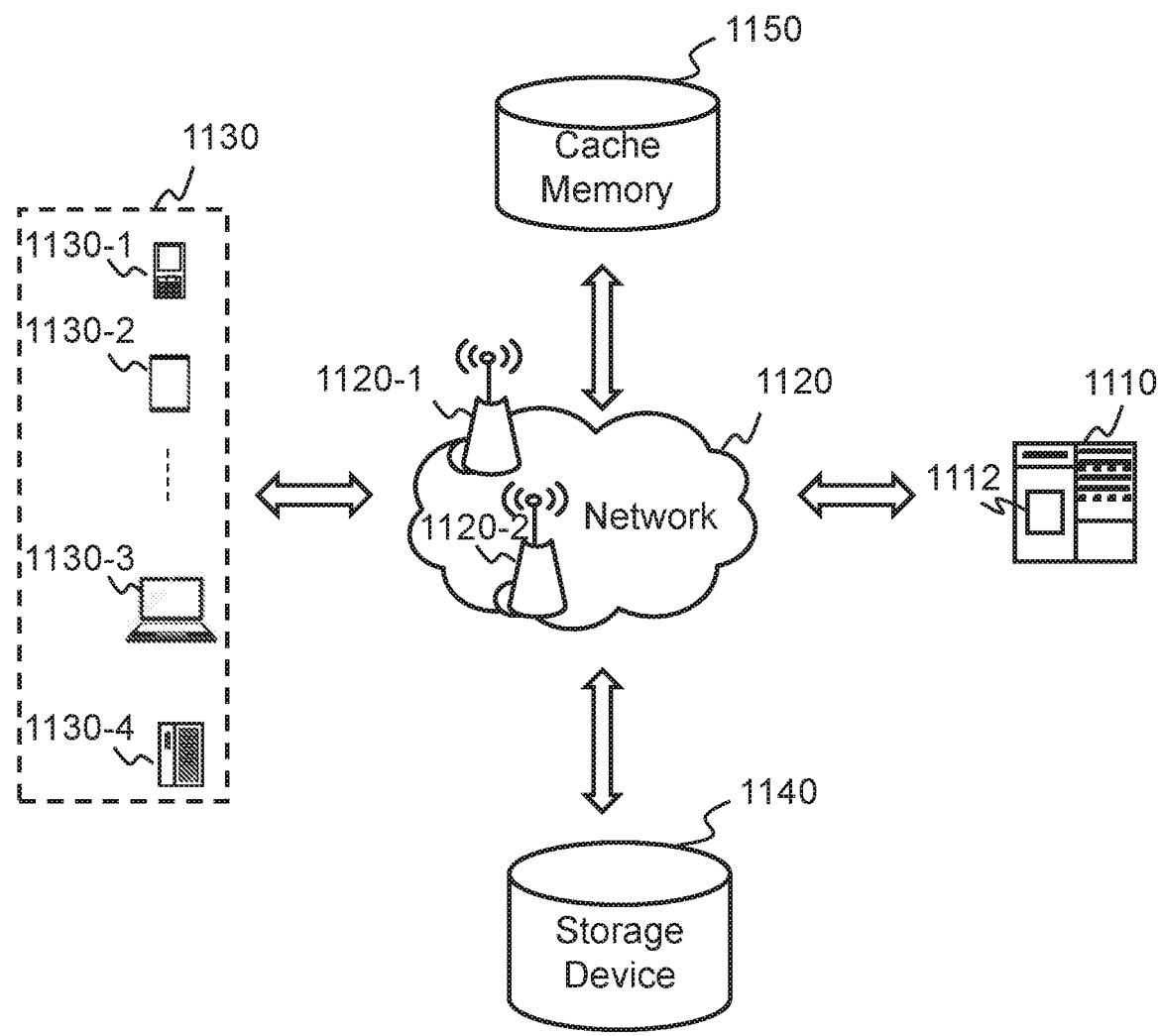
FIG. 11 is a schematic diagram illustrating an exemplary data processing system according to some embodiments of the present disclosure.

In some embodiments, one or more operations of process 100 may be executed by the data processing system 1100 as illustrated in FIG. 11. For example, one or more operations of the process 100 may be stored in a storage device (e.g., a storage device 1140, the ROM 1230, the RAM 1240, the storage 1390) as a set of instructions. In some embodiments, the server 1110 (e.g., the processing engine 1112 in the server 1110, the processor 1220 of the processing engine 1112), the terminal 1130, a data processing device (e.g., any one of devices 600 to 900) may execute the set of instructions. For illustration purposes, the implementation of the process 100 by the processing engine 1112 is described as an example.

In 101, for each feature dimension i of an original data set, the processing engine 1112 may select a characteristic value $M_i$ from a plurality of feature values of the feature dimension i. The processing engine 1112 may also record a corresponding relationship between each feature dimension i and the corresponding characteristic value $M_i$. In some embodiments, the original data set may include at least one feature dimension.

The original data set may be a data source for data processing, and include at least one feature dimension. The original data set may include, for example, user data of an Internet platform. The Internet platform may be a car hailing application, a website for user transactions, a website for user communication, etc. The user data may include at least one dimensional of feature. Each dimensional of feature may be represented as a feature dimension. Each feature dimension may include at least one feature value. The feature value(s) of a feature dimension may be discrete or continuous.

In some embodiments, the original data set may include feature information of a plurality of entities. The feature information may include at least one feature dimension for each entity and at least one feature value for each feature dimension. In some embodiments, an entity may refer to something having a real existence, as a subject or as an object, currently or potentially, concretely or abstractly, physically or virtually. For example, the plurality of entities may include at least one of service requesters, service providers, or service orders in an online to offline (O2O) service system. In some embodiments, the original data set may be stored in a storage device (e.g., a storage device 1140, a ROM 1230, a storage 1390) of the data processing system 1000.

In some embodiments, the feature dimension i may also be referred to as a selected feature dimension of the at least one feature dimension of the entities. In some embodiments, the selected feature dimension may be selected from the at least one feature dimension randomly or according to a selection rule by the processing engine 1112. Additionally or alternatively, the selected feature dimension may be selected by a user manually via a terminal 1130. In certain embodiments, a portion or all of the at least one feature dimension of the entities may be selected as selected feature dimension(s). The processing engine 1112 may select and/or determine a characteristic value for each selected feature dimension.

In some embodiments, the original data set may be a data set related to a plurality of users of a car hailing application. The original data set may include three feature dimensions, such as the age, the gender, and the number of orders in the last 30 days of the users as shown in Table 1. As shown in Table 1, the user ID may be a user number registered by a user in the car hailing application, which is used to identify the user. The age of users may be represented by interval numbers. For example, "70s" represents that the user was born between 1970 and 1979, "80s" represents that the user was born between 1980 and 1989, and "90s" represents that the user was born between 1990 and 1999.

TABLE 1 of User Information

| User ID | Age | Gender | The Number of Orders in the Last 30 Days |
|---|---|---|---|
| Y001 | 80s | Female | 0 |
| Y002 | 80s | Female | 0 |
| Y003 | 80s | Male | 5 |
| Y004 | 90s | Female | 0 |
| Y005 | 70s | Male | 0 |

In the above mentioned example illustrated in Table 1, the feature dimension "age" may include feature values of "70s" "80s" and "90s". The feature dimension "gender" may include feature values of "female" and "male". The feature dimension "the number of orders in the last 30 days" may include feature values of "0" and "5".

In some embodiments, the characteristic value $M_i$ of the feature dimension i may be selected according to a preset rule. For example, the characteristic value $M_i$ may be selected based on a statistical distribution of the feature values of the feature dimension i. It should be noted that the characteristic value $M_i$ may be selected by any other means. In some embodiments, a feature value of the feature dimension i with any distribution proportion may be designated as the characteristic value $M_i$. For example, any one of "70s", "80s", and "90s" may be selected as the characteristic value $M_i$ of the feature dimension "age". In order to improve the cache efficiency, a feature value having the largest distribution proportion may be selected as the characteristic value $M_i$. It should be understood that any feature value can be selected as the characteristic value $M_i$ to improve the cache efficiency.

As used herein, a distribution proportion of a feature value with respect to a feature dimension refers to a proportion of entities (e.g., users) having the feature value with respect to the feature dimension among all the entities. A feature value having the largest distribution proportion in a feature dimension may also be referred to as a mode among the feature values of the feature dimension. For example, according to Table 1, the distribution proportion of "70s", "80s", and "90s" with respect to the feature dimension "age" may be 20%, 60% and 20%, respectively. The feature value "80s" may be the mode among the feature values of the feature dimension "age" and have the largest distribution proportion, which may be designated as the characteristic value of the feature dimension "age".

The processing engine 1112 may establish a corresponding relationship between each feature dimension i and the corresponding characteristic value Mi to record the corresponding relationship. In some embodiments, the corresponding relationship may be recorded in a mapping table. In some embodiments, different corresponding relationships of different feature dimensions i may be recorded separately in different mapping tables. Additionally or alternatively, different corresponding relationships of different feature dimensions i may be jointly recorded in one mapping table. The mapping table(s) may be stored in a storage device of the data processing system 1100 (e.g., the storage device 1140, the cache memory 1150, the ROM 1230, the RAM 1240, the storage 1390).

For example, if the selected characteristic value Mi of the feature dimension "age" is "70s", a mapping table of age may be established as shown in Table 2. If the selected characteristic value Mi of the feature dimension "gender" is "male", a mapping table of gender may be established as shown in Table 3. If the selected characteristic value Mi of the feature dimension "the number of orders in the last 30 days" is "0", a mapping table of the number of orders in the last 30 days may be established as shown in Table 4. It should be noted that the mapping tables shown in Tables 2, 3 and 4 may be recorded and/or stored jointly in one mapping table.

TABLE 2

Mapping Table of Age

| Age | 70s |
| --- | --- |

TABLE 3

Mapping Table of Gender

| Gender | Male |
| --- | --- |

TABLE 4

Mapping Table of the Number of Orders in the Last 30 Days

| The Number of Orders in the Last 30 Days | 0 |
| --- | --- |

In 102, for each feature dimension i of the original data set, the processing engine 1112 may cache feature value(s) of the feature dimension i other than the corresponding characteristic value Mi into a cache memory.

In some embodiments, if the feature value of the feature dimension i of an entity is unequal to the characteristic value Mi, the processing engine 1112 may cache the corresponding feature value of the feature dimension i of the entity into the cache memory. On the other hand, if the feature value of the feature dimension i of an entity is equal to the characteristic value Mi, the processing engine 1112 may leave the corresponding feature value of the feature dimension i without caching.

For example, the characteristic values Mi of the feature dimensions "age", "gender", and "the number of orders in the last 30 days" may be "70s", "male", and "0", respectively. The data cached into the cache memory may be shown as Table 5, in which "NULL" represents that the corresponding feature value(s) are null in the cache memory. It should be noted that the cached data illustrated in Table 5 may be determined according to the characteristic values Mi selected in operation 101. This is not intended to be limiting, and the cached data may not be limited to the example illustrated in Table 5.

TABLE 5 of User Information Cached into the Cache Memory

| User ID | Age | Gender | The Number of Orders in the Last 30 Days |
| --- | --- | --- | --- |
| Y001 | 80s | Female | NULL |
| Y002 | 80s | Female | NULL |
| Y003 | 80s | NULL | 5 |
| Y004 | 90s | Female | NULL |
| Y005 | NULL | NULL | NULL |

In 103, the processing engine 1112 may perform a search (also referred to as a first search) in the cache memory in response to a query request.

The query request may include a single query condition or a compound query condition. The single query condition may only include one query condition, while the compound query condition may include at least two query conditions. For example, a query request including a single query condition may be a request to search data (e.g., the age, the gender, and the number of orders in the last 30 days) of a user whose ID is "Y001", or a request to search data of all users whose age is "80s". A query request including a compound query condition may be a request to search data of all users whose age is "80s" or "90s", or a request to search data of all users whose age is "80s" and gender is "female".

Upon receiving the query request, the processing engine 1112 may perform the search in the cache memory according to the query request. In some embodiments, if the returned value(s) of the search based on the cached data is not null (that is, the search result of the search does not include one or more empty returns), the processing engine 1112 may generate a query result based on the returned value(s). Merely by way of example, if the query condition of the query request is to search the age of a user whose ID is "Y001", the corresponding query result generated based on the returned value(s) may be "80s". If the query condition of the query request is to search the gender of a user whose ID is "Y002", the corresponding query result generated based on the returned value(s) may be "female". If the query condition of the query request is to search the number of orders in the last 30 days of a user whose ID is "Y003", the corresponding query result generated based on the returned value(s) may be "5". If the query condition of the query request is to search users whose age is "80s" and gender is "female", the corresponding query result generated based on the returned value(s) may be "Y001 and Y002". In some embodiments, if one or more returned values of the search based on the cached data are null (that is, the search result includes one or more empty returns), the processing engine 1112 may proceed to operation 104.

In 104, the processing engine 1112 may replace one or more feature values that are null in the cache memory by the corresponding characteristic value(s) Mi based on the query request and the recorded corresponding relationship(s). The processing engine 1112 may then generate the query result based on the replacement result.

When a returned value of the search based on the cached data is null (or being referred to as "empty"), the processing engine 1112 may extract a feature dimension corresponding to the query condition according to the query request. The processing engine 1112 may replace the null value(s) of the extracted feature dimension in the cache memory by the corresponding characteristic value Mi based on the recorded corresponding relationship of the extracted feature dimension and its characteristic value Mi. The processing engine 1112 may then generate the query result according to the replacement result.

For example, if the query condition of the query request is to search the gender of a user whose ID is "Y003", the corresponding feature value may be null in the cache memory, which may result in a null return value. The processing engine 1112 may extract the feature dimension corresponding to the query condition based on the query request, that is, the feature dimension "gender". According to the pre-stored mapping table of gender (e.g., Table 3), the characteristic value of the feature dimension "gender" may be "male". The processing engine 1112 may replace the null feature value(s) of the feature dimension "gender" in the cache memory by "male". In that cases, the replacement result of the null feature value(s) of the feature dimension "gender" may be "male". The processing engine 1112 may then generate the query result based on the replacement result. For example, the query result may be that "the gender of the user whose ID is "Y003" is male".

As another example, if the query condition of the query request is to search the age and the number of orders in the last 30 days of a user whose ID is "Y001", two feature values A and B may be involved. The feature value A may be "80s", which is the age of the user whose ID is "Y001". The feature value B may be null in the cache memory, which is the number of orders in the last 30 days of the user whose ID is "Y001". According to the feature value A, the processing engine 1112 may generate a query result, e.g., "the age of the user whose ID is "Y001" is 80s". According to the feature value B, the processing engine 1112 may extract a feature dimension corresponding to the query condition based on the query request, that is, the feature dimension "the number of orders in the last 30 days". Based on the pre-stored mapping table of the number of orders in the last 30 days (e.g., Table 4), the processing engine 1112 may replace the null feature value(s) of the feature dimension "the number of orders in the last 30 days" in the cache memory by "0". In that case, the replacement result of the null feature value(s) of the feature dimension "the number of orders in the last 30 days" may be "0". The processing engine 1112 may generate the query result based on the replacement result. For example, the query result may be that "the number of orders in the last 30 days of the user whose ID is "Y001" is 0".

In the above mentioned example as shown in Table 5, if there are 5 users, the cached user information may be 7 fields less than the original data set. The mapping table of feature dimensions and characteristic values may need 6 fields for storing comprehensiveness of information of users. Thus, according to the data processing process disclosed in the present disclosure, the cached user information and the mapping table may need 1 field in the cache memory less than the original data set. Compared with caching the original data set, the data processing process disclosed in the present disclosure may save a large number of fields when there are a great number of users (e.g., 200 million) and hundreds of feature dimensions. In this way, the total amount of cached data may be compressed, the cache efficiency may be improved, and the caching cost may be reduced without losing the total amount of information. The saved cache space may be used for caching data of more feature dimensions when the cache capacity is limited, which may improve the integrity of data.

In some embodiments, the data processing process described above may be implemented on an online service system. The online service system may be configured with a cache cluster and an access server. User feature data may be cached in a memory of the cache cluster, which can increase the speed of accessing data. The corresponding relationship of a feature dimension and its characteristic value may be stored locally on the access server, or in another storage device of the online service system. The access server may access the corresponding relationship when a feature value is null in the cache memory. In some embodiments, when the online service system adopts a machine learning or deep learning technique, the online service system may use the data processing process in machine learning or deep learning models, taking advantages of artificial intelligence.

It should be noted that the present disclosure takes discrete feature values of each feature dimension as an example for description. In some embodiments, the feature values of a feature dimension may be continuous. In addition, in the above exemplary embodiments, the data processing process of the present disclosure is implemented on all feature dimensions. In some embodiments, the process may be implemented on a portion of the feature dimensions.

In some embodiments, the processing engine 1112 may divide the feature values of a feature dimension i into one or more intervals. The processing engine 1112 may further designate one of the interval(s) as a characteristic interval. For the feature value(s) of the feature dimension not within the characteristic interval, the processing engine 1112 may cache the feature value(s) into the cache memory. For the feature value(s) of the feature dimension within the characteristic interval, the processing engine 1112 may leave the feature value(s) without caching. Merely by way of example, the processing engine 1112 may divide the feature values of the total number of orders into a plurality of intervals, such as, 0-5, 6-10, 11-15, and more than 15, among which 0-5 is designated as a characteristic interval corresponding to the total number of orders. The feature value(s) of the total number of orders not within 0-5 may be cached into the cache memory while the feature value(s) of the total number of orders within 0-5 may be left without caching.

The technical solutions disclosed in the present disclosure may include the following beneficial effects.

For each feature dimension i in the original data set, the processing engine 1112 may select a characteristic value Mi from a plurality of feature values of the feature dimension i, and record a corresponding relationship between the feature dimension i and Mi. The processing engine 1112 may cache feature values of the feature dimension i other than the characteristic value Mi for each feature dimension i of the original data set into a cache memory. In this case, the amount of cached data may be reduced. The processing engine 1112 may perform a search in the cache memory in response to a query request. If returned value(s) of the search based on the cached data is not null, the processing engine 1112 may generate a query result according to the returned value(s). On the other hand, if the returned value(s) of the search based on the cached data includes a null value, the processing engine 1112 may replace one or more feature values that are null in the cache memory by the corresponding characteristic value(s) Mi based on the query request and the recorded corresponding relationship. The processing engine 1112 may generate a query result based on the replacement result. In this case, the total amount of cached data may be compressed. The cache efficiency may be improved, and the caching cost can be reduced without losing the total amount of information. The saved cache space may be used for caching data of more feature dimensions when the cache capacity is limited, which may improve the integrity of data.

FIG. 2 is a flowchart illustrating an exemplary process for data processing according to some embodiments of the present disclosure. In some embodiments, a feature value with the largest distribution proportion of a feature dimension i may be determined as a characteristic value Mi of the feature dimension i. The data processing process 200 (also referred to as process 200) of the present disclosure may greatly improve the cache efficiency, save the memory space of the cache memory, and reduce the caching cost.

In some embodiments, the process 200 may be an embodiment of the process 100 as described in connection with FIG. 1. In some embodiments, one or more operations of process 200 may be executed by the data processing system 1100 as illustrated in FIG. 11. For example, one or more operations of the process 200 may be stored in a storage device (e.g., the storage device 1140, the ROM 1230, the RAM 1240, the storage 1390) as a set of instructions. In some embodiments, the server 1110 (e.g., the processing engine 1112 in the server 1110, the processor 1220 of the processing engine 1112 in the server 1110, the terminal 1130, a data processing device (e.g., any one of devices 600 to 900) may execute the set of instructions. For illustration purposes, the implementation of the process 200 by the processing engine 1112 is described as an example.

In 201, for each feature dimension i of an original data set, the processing engine 1112 may determine a feature value with the largest distribution proportion among a plurality of feature values of the feature dimension i as a characteristic value Mi. The processing engine 1112 may record a corresponding relationship between each feature dimension i and the corresponding characteristic value Mi.

In some embodiments, the original data set may be shown in Table 1. The processing engine 1112 may determine a feature value having the largest distribution proportion of each feature dimension i as the characteristic value Mi of the feature dimension i based on a statistical distribution of the feature values of the feature dimension i. For example, for the feature dimension "age", users whose age is "80s" have the largest distribution proportion. Thus, "80s" may be determined as the characteristic value Mi of the feature dimension "age". Similarly, "female" may be determined as the characteristic value Mi of the feature dimension "gender". "0" may be determined as the characteristic value Mi of the feature dimension "the number of orders in the last 30 days". A corresponding relationship between the feature dimension "age" and its corresponding characteristic value Mi (also referred to as a mapping table of age) may be established as shown in Table 6. A corresponding relationship between the feature dimension "gender" and its corresponding characteristic value Mi (also referred to as a mapping table of gender) may be established as shown in Table 7. A corresponding relationship between the feature dimension "the number of orders in the last 30 days" and its corresponding characteristic value Mi (also referred to as a mapping table of the number of orders in the last 30 days) may be established as shown in Table 4 described in FIG. 1.

TABLE 6

Mapping Table of Age

| Age | 80s |
|---|---|

TABLE 7

Mapping Table of Gender

| Gender | Female |
|---|---|

In 202, for each feature dimension i of the original data set, the processing engine 1112 may cache feature value(s) of the feature dimension i other than the corresponding characteristic value Mi into a cache memory. Operation 202 may be performed in a similar manner with operation 102, and the descriptions thereof are not repeated here.

For example, according to the characteristic value(s) Mi determined in operation 201, the data cached into the cache memory may be shown as Table 8.

TABLE 8 of User Information Cached into the Cache Memory

| User ID | Age | Gender | The Number of Orders in the Last 30 days |
|---|---|---|---|
| Y001 | NULL | NULL | NULL |
| Y002 | NULL | NULL | NULL |
| Y003 | NULL | Male | 5 |
| Y004 | 90s | NULL | NULL |
| Y005 | 70s | Male | NULL |

In 203, the processing engine 1112 may perform a search in the cache memory in response to a query request.

In 204, the processing engine 1112 may replace one or more feature values that are null in the cache memory by the corresponding characteristic value(s) Mi based on the query request and the recorded corresponding relationship(s). The processing engine 1112 may generate a query result based on the replacement result.

Operations 203 and 204 may be performed in a similar manner with operations 103 and 104, respectively, and the descriptions thereof are not repeated here.

In the above mentioned example as shown in Table 8, if there are 5 users, the cached user information may be 10 fields less than the original data set. The mapping table of feature dimensions and characteristic values may need 6 fields for storing comprehensiveness of information of users. Thus, according to the data processing process disclosed in the present disclosure, the cached user information and the mapping table may need 4 fields in the cache memory less than the original data set. Compared with caching the original data set, the data processing process disclosed in the present disclosure may save a large number of fields when there are a great number of users (e.g., 200 million) and hundreds of feature dimensions. In this way, the total amount of cached data may be greatly compressed, the cache efficiency may be greatly improved, and the caching cost may be greatly reduced without losing the total amount of information. The saved cache space may be used for caching data of more feature dimensions when the cache capacity is limited, which may improve the integrity of data.

In some embodiments, the feature value having the largest distribution proportion of the feature dimension i may be determined as the characteristic value Mi of the feature dimension i. This may greatly compress the total amount of cached data, improve the cache efficiency, and reduce the caching cost without a loss of the total amount of information. The saved cache space may be used for caching data of more feature dimensions when the cache capacity is limited, which may improve the integrity of data.

It should be noted that the original data set may need to be updated due to actual conditions, such as registrations of new users, massive data updating, policy changes of the platform, etc. Therefore, the corresponding relationship between a feature dimension and its characteristic value may need to be updated to ensure the accuracy of the query result. The update of the original data set and/or the corresponding relationship may be caused by various factors, such as but not limited to a manual input (e.g., an instruction of a user received from a terminal 1130), a time condition (e.g., a requirement of periodical update or real-time update), a certain event (e.g., a massive data updating, registrations of new users), etc.

In 205, the processing engine 1112 may update the original data set. The updated original data set may be regarded as a new data source on which the data processing process disclosed in the present disclosure is implemented. In some embodiments, the updated original data set may include feature information of one or more new entities. Additionally or alternatively, the updated original data set may include updated feature information of the original entities, such as but not limited to updated feature values of the original feature dimension(s), feature information of one or more new feature dimensions.

In 206, the processing engine 1112 may update a distribution proportion of each feature value of the feature dimension i based on the updated original data set.

Merely by way of example, "female" is a feature value that has the largest distribution proportion in the feature dimension "gender". After the original data set is updated, "male" becomes a feature value that has the largest distribution proportion in the feature dimension "gender".

In 207, the processing engine 1112 may update the characteristic value Mi based on the updated distribution proportion(s) of feature value(s) in the feature dimension i.

In the above mentioned example, the characteristic value Mi of the feature dimension "gender" may change from "female" to "male".

In 208, the processing engine 1112 may update the corresponding relationship between i and Mi based on the updated characteristic value Mi.

In the above mentioned example, the corresponding relationship between the feature dimension "gender" and its characteristic value Mi may be updated. For example, the mapping table of gender as shown in Table 7 may be updated to the mapping table of gender as shown in Table 3.

In some embodiments, after operations 205 to 208, the processing engine 1112 may proceed to operations 202 to 204. In 202, for each feature dimension i in the updated original data set, the processing engine 1112 may cache feature value(s) other than the corresponding updated characteristic value Mi into the cache memory.

In some embodiments, after 204, the processing engine 1112 may determine whether a condition of data updating is satisfied. In response to a determination that the condition of data updating is satisfied, the processing engine 1112 may proceed to operation 205. The condition of data updating may be related to, for example but not limited to the change of the number of entities in the original data set, an instruction to update data received from a user, the interval between the current time and the last data updating, or the like, or any combination thereof. For example, the processing engine 1112 may determine whether the number of the entities in the original data set changes over a threshold. If the processing engine 1112 determines that the condition of data updating is satisfied, it may proceed to operation 205 to update the original data set.

In some embodiments, the processing engine 1112 may perform the process 200 on each feature dimension of the entities in the original data set. Alternatively, the processing engine 1112 may perform the process 200 on a portion of the feature dimension(s) of the entities in the original data set.

In the present disclosure, the feature value having the largest distribution proportion of a feature dimension i may be determined as the characteristic value Mi of the feature dimension i, which may greatly compress the total amount of cached data, improve the cache efficiency, and reduce the caching cost without losing the total amount of information. Besides, the cached data and the corresponding relationship(s) between feature dimension(s) and the corresponding characteristic value(s) may be updated based on the updated original data set, which may ensure the accuracy of the query result.

FIG. 3 is a flowchart illustrating an exemplary process for data processing according to some embodiments of the present disclosure.

In some embodiments, process 300 may be an embodiment of the process 100 as described in connection with FIG. 1. In some embodiments, one or more operations of process 300 may be executed by the data processing system 1100 as illustrated in FIG. 11. For example, one or more operations of the process 300 may be stored in a storage device (e.g., the storage device 1140, the ROM 1230, the RAM 1240, the storage 1390) as a set of instructions. In some embodiments, the server 1110 (e.g., the processing engine 1112 in the server 1110, the processor 1220 of the processing engine 1112 in the server 1110, the terminal 1130, a data processing device (e.g., any one of devices 600 to 900) may execute the set of instructions. For illustration purposes, the implementation of the process 300 by the processing engine 1112 is described as an example.

In 301, for each feature dimension i of an original data set, the processing engine 1112 may select a characteristic value Mi from a plurality of feature values of the feature dimension i. The processing engine 1112 may record a corresponding relationship between each feature dimension i and the corresponding characteristic value Mi.

In 302, for each feature dimension i of the original data set, the processing engine 1112 may cache feature value(s) of the feature dimension i other than the corresponding characteristic value Mi into a cache memory.

Operations 301 and 302 may be performed in a similar manner with operations 101 and 102, respectively, and the descriptions thereof are not repeated here.

In some embodiments, the original data set may be shown in Table 1. The corresponding relationships between feature dimensions and the corresponding characteristic values may be shown in Tables 4, 6, and 7. The cached data may be shown in Table. 8.

In 303, in response to a query request, the processing engine 1112 may determine whether the query request includes a query condition that includes a feature dimension i and its corresponding characteristic value Mi based on the recorded corresponding relationship(s). In response to a determination that the query request includes the query condition that includes the feature dimension i and its corresponding characteristic value Mi, the processing engine 1112 may proceed to operation 304. In other words, the processing engine 1112 may determine whether the query request is related to a feature dimension i and its corresponding characteristic value Mi. In response to a determination that the query request is related to the feature dimension i and its characteristic value, the processing engine 1112 may proceed to operation 304

Merely by way of example, a query request is to search the IDs of users who satisfy a query condition "age=80s". Upon receiving the query request, the processing engine 1112 may determine that the query condition includes the feature dimension "age" and its characteristic value "80s" according to the mapping table of age as shown in Table 6. Then the processing engine 1112 may proceed to operation 304.

In 304, the processing engine 1112 may replace the characteristic value Mi in the query condition of the query request by a null value. In other words, the processing engine 112 may update the query request by an empty entry (e.g., the null value). The updated query request may include the feature dimension i and the empty entry. The processing engine 1112 may then perform a search in the cache memory based on the updated query request.

In the above mentioned example, the original query condition for searching users' ID may be "age=80s", which may be updated to a query condition "age=null". Therefore, the processing engine 1112 may generate a query result that satisfies the original query condition by performing the search in the cache memory based on the updated query request. For example, the query result may be Y001, Y002, and Y003.

In 305, the processing engine 1112 may replace one or more feature values that are null in the cache memory by the corresponding characteristic value(s) Mi based on the query request and the recorded corresponding relationship(s). The processing engine 1112 may generate a query result based on the replacement result.

Operation 305 may be performed in a similar manner with operation 104, and the descriptions thereof are not repeated here.

Merely by way of example, the query request is to search data (e.g., the gender, the age, and the number of orders in the last 30 days) of all users whose satisfies query conditions "age=80s" and "gender=male". Upon receiving the query request, the processing engine 1112 may determine that the query request includes a query condition including the feature dimension "age" and the characteristic value "80s" based on the mapping table of age as shown in Table 6. The processing engine 1112 may replace the characteristic value "80s" in the query condition of the query request by a null value. Thus, the updated query request may be to search data (e.g., the gender, the age, and the number of orders in the last 30 days) of all users whose satisfies updated query conditions "age=Null" and "gender=male". The processing engine 1112 may perform the search in the cache memory based on the updated query request. The query result may be shown in Table 9.

TABLE 9

Query Result

| User ID | Age | Gender | The Number of Orders in the Last 30 days |
|---------|-----|--------|------------------------------------------|
| Y003 | 80s | Male | 5 |

As an alternative to the approach above for 305, in some embodiments, the processing engine 1112 may generate the query result directly based on the search result of the search performed in operation 304. Merely by way of example, the updated query request including the updated query condition may be a request to search the IDs of users whose gender is "Null". By searching the user information in the cache memory as illustrated in Table 8 according to the updated query request, the processing engine 1112 may generate the search result, that is, "Y001, Y002, and Y004".

Alternatively, in certain embodiments, when the search results include the characteristic value of a selected feature dimension and the associated feature dimensions (e.g. the User ID), the processing engine 1112 may further determine whether the search result of the search includes an empty return (for the characteristic value). If the search result includes an empty return, the processing engine 1112 may generate the query result based on the search result and the corresponding relationship(s) between feature dimensions and characteristic values. Merely by way of example, the updated query request including the updated query condition may be a request to search the number of orders in the last 30 days of a user whose age is "90s" and gender is "Null". According to the user information in the cache memory as illustrated in Table 8, the search result from an initial search (e.g. can be referred to a first search) may be "Null". The processing engine 1112 may further generate the query result by replacing the "Null" of the feature dimension "the number of orders in the last 30 days" by the corresponding characteristic value (e.g., "0" according to Table 4).

In the processes herein described, if the query request includes a query condition including a feature dimension i and its corresponding characteristic value Mi, the processing engine 1112 may update the query request. The processing engine 1112 may then perform a search in the cache memory based on the updated query request. This may avoid a failure in obtaining the query result according to the original query request.

FIG. 4 is a flowchart illustrating an exemplary process for data processing according to some embodiments of the present disclosure. In some embodiments, in process 400, in response to a query request, null feature value(s) of a feature dimension in the cache memory may be replaced by corresponding characteristic value Mi based on the recorded corresponding relationship. A search may then be performed in the cache memory based on the query request. The process 400 disclosed in the present disclosure can avoid a failure in obtaining a query result according to the query request.

In some embodiments, process 400 may be an embodiment of the process 100 as described in connection with FIG. 1. In some embodiments, one or more operations of process 400 may be executed by the data processing system 1100 as illustrated in FIG. 11. For example, one or more operations in the process 400 may be stored in a storage device (e.g., the storage device 1140, the ROM 1230, the RAM 1240, the storage 1390) as a set of instructions. In some embodiments, the server 1110 (e.g., the processing engine 1112 in the server 1110, the processor 1220 of the processing engine 1112 in the server 1110, the terminal 1130, a data processing device (e.g., any one of devices 600 to 900) may execute the set of instructions. For illustration purposes, the implementation of the process 400 by the processing engine 1112 is described as an example.

In 401, for each feature dimension i of an original data set, the processing engine 1112 may select a characteristic value Mi from a plurality of feature values of the feature dimension i. The processing engine 1112 may record a corresponding relationship between each feature dimension i and the corresponding characteristic value Mi In 402, for each feature dimension i of the original data set, the processing engine 1112 may cache feature value(s) of the feature dimension i other than the corresponding characteristic value Mi into a cache memory.

Operations 401 and 402 may be performed in a similar manner with operations 101 and 102, respectively, and the descriptions thereof are not repeated herein.

In some embodiments, the original data set may be shown in Table 1. The corresponding relationships between feature dimensions and the corresponding characteristic values may be shown in Tables 4, 6, and 7. The cached data may be shown in Table. 8.

In 403, in response to a query request, the processing engine 1112 may replace null feature value(s) in the cache memory by corresponding characteristic value(s) Mi based on the corresponding relationship(s). In other words, for each feature dimension i, the processing engine 1112 may cache the corresponding characteristic value Mi into the cache memory for each entity whose feature dimension i has an empty entry. The processing engine 1112 may then perform a search in the cache memory based on the query request.

For example, the processing engine 1112 may replace feature values that are "NULL" in Table 8 by the corresponding characteristic values according to the corresponding relationships as shown in Tables 4, 6 and 7. Merely by way of example, the processing engine 1112 may replace the "Null" feature value(s) of the feature dimension "age" by "80s". The processing engine 1112 may replace the "Null" feature value(s) of the feature dimension "gender" by "female". The processing engine 1112 may replace the "Null" feature value(s) the feature dimension "the number of orders in the last 30 days" by "0". The cached data after the replacement may be shown in Table 1.

In 404, the processing engine 1112 may generate a query result based on a search result of the search in the cache memory.

Merely by way of example, the query request may include a query condition to search the total number of orders in the last 30 days of all users whose age is "80s" and gender is "female". Upon receiving the query request and according to the corresponding relationships in Tables 4, 6 and 7, the processing engine 1112 may replace the Null feature value(s) of the feature dimension "age" by "80s", the Null feature value(s) of the feature dimension "gender" by "female", and the Null feature value(s) of the feature dimension "the number of orders in the last 30 days" by "0". The cached data after the replacement may be shown in Table 1. According to Table 1, data of users who satisfy the query condition of the query request may be shown in Table 10. As shown in Table 10, users "Y001" and "Y002" satisfy the query condition of the query request. The processing engine 1112 may sum up the numbers of orders in the last 30 days of "Y001" and "Y002" to generate the query result. Since the numbers of orders in the last 30 days of "Y001" and "Y002" are both 0, the query result may be 0.

TABLE 10 of User Information

| User ID | Age | Gender | The Number of Orders in the Last 30 days |
|---------|-----|--------|------------------------------------------|
| Y001 | 80s | Female | 0 |
| Y002 | 80s | Female | 0 |

In the processes herein described, upon receiving the query request, the processing engine 1112 may replace the null feature value(s) in the cache memory by corresponding characteristic value(s) Mi according to the recorded corresponding relationship(s). The processing engine 1112 may then perform a search in the cache memory based on the query request, which can avoid a failure in obtaining a query result according to the query request.

FIG. 5 is a flowchart illustrating an exemplary process for data processing according to some embodiments of the present disclosure.

In some embodiments, process 500 may be an embodiment of the process 100 as described in connection with FIG. 1. In some embodiments, one or more operations of process 500 may be executed by the data processing system 1100 as illustrated in FIG. 11. For example, one or more operations in the process 500 may be stored in a storage device (e.g., the storage device 1140, the ROM 1230, the RAM 1240, the storage 1390) as a set of instructions. In some embodiments, the server 1110 (e.g., the processing engine 1112 in the server 1110, the processor 1220 of the processing engine 1112 in the server 1110, the terminal 1130, a data processing device (any one of devices 600 to 900) may execute the set of instructions. For illustration purposes, the implementation of the process 500 by the processing engine 1112 is described as an example.

In 501, for each feature dimension i of an original data set, the processing engine 1112 may select a characteristic value Mi from a plurality of feature values of the feature dimension i. The processing engine 1112 may record a corresponding relationship between each feature dimension i and the corresponding characteristic value Mi.

In 502, for each feature dimension i of the original data set, the processing engine 1112 may cache feature value(s) of the feature dimension i other than the corresponding characteristic value Mi into a cache memory.

Operations 501 and 502 may be performed in a similar manner with operations 101 and 102, respectively, and the descriptions thereof are not repeated herein.

In some embodiments, the original data set may be shown in Table 1. The corresponding relationships between feature dimensions and the corresponding characteristic values may be shown in Tables 4, 6, and 7. The cached data may be shown in Table. 8.

In 503, in response to a query request, the processing engine 1112 may determine whether the query request includes a query condition that includes a feature dimension i based on the recorded corresponding relationship(s). In response to a determination that the query request includes the query condition that includes the feature dimension i, the processing engine 1112 may proceed to operation 504. In other words, the processing engine 1112 may determine whether the query request is related to a feature dimension i. In response to a determination that the query request is related to the feature dimension i, the processing engine 1112 may proceed to operation 504.

Merely by way of example, the processing engine 1112 may determine whether the query condition of the query request includes at least one of the feature dimensions "gender", "age", or "the number of orders in the last 30 days". In response to a determination that the query condition includes at least one of the feature dimensions "gender", "age", or "the number of orders in the last 30 days", the processing engine 1112 may proceed to operation 504.

In 504, the processing engine 1112 may replace null feature value(s) corresponding to the feature dimension i in the cache memory by the corresponding characteristic value(s) Mi. In other words, the processing engine 1112 may cache the characteristic value(s) Mi of the feature dimension i into the cache memory for each entity whose feature dimension i has an empty entry. The processing engine 1112 may perform a search in the cache memory based on the query request.

For example, if the query condition of a query request includes the feature dimension "age", the processing engine 1112 may replace the "Null" feature value(s) of the feature dimension "age" as shown in Table 8 by "80s". If the query condition of a query request includes the feature dimension "gender", the processing engine 1112 may replace the "Null" feature value(s) of the feature dimension "gender" as shown in Table 8 by "female". If the query condition of a query request includes the feature dimension "the number of orders in the last 30 days", the processing engine 1112 may replace the "Null" feature value(s) of the feature dimension "the number of orders in the last 30 days" as shown in Table 8 by "0".

In 505, the processing engine 1112 may generate a query result based on a search result of the search in the cache memory.

Merely by way of example, the query request may include a query condition to search the total number of orders in the last 30 days of all users whose age is "80s" and gender is "female". Upon receiving the query request, according to the corresponding relationships in Tables 6 and 7, the processing engine 1112 may replace the "Null" feature value(s) of the feature dimension "age" as shown in Table 8 by "80s", and the "Null" feature value(s) of the feature dimension "gender" as shown in Table 8 by "female". The cached data after the replacement may be shown in Table 11. Based on Table 11, data of users who satisfy the query condition of the query request may be shown in Table 12. As shown in Table 12, users "Y001" and "Y002" satisfy the query condition of the query request. The processing engine 1112 may sum up the numbers of orders in the last 30 days of Y001 and Y002 to generate the query result. According to Table 4, since the numbers of orders in the last 30 days of "Y001" and "Y002" are both 0, the query result may be 0.

TABLE 11 of User Information

| User ID | Age | Gender | The Number of Orders in the Last 30 days |
|---|---|---|---|
| Y001 | 80s | Female | NULL |
| Y002 | 80s | Female | NULL |
| Y003 | 80s | Male | 5 |
| Y004 | 90s | Female | NULL |
| Y005 | 70s | Male | NULL |

TABLE 12 of User Information

| User ID | Age | Gender | The Number of Orders in the Last 30 days |
|---|---|---|---|
| Y001 | 80s | Female | NULL |
| Y002 | 80s | Female | NULL |

In the processes herein described, in response to a query request, the processing engine 1112 may determine whether the query condition of the query request includes a feature dimension i based on the recorded corresponding relationship. In response to a determination that the query condition includes the feature dimension i, the processing engine 1112 may replace null feature value(s) of the feature dimension i in the cache memory by the corresponding characteristic value Mi. The processing engine 1112 may then perform a search in the cache memory based on the query request. The processes herein described may reduce the amount of data replacement and avoid a failure in obtaining a query result since data in the cache memory are replaced according to the query request.

FIG. 6 is a schematic diagram illustrating an exemplary device for data processing 600 according to some embodiments of the present disclosure. In some embodiments, the data processing device 600 (also referred to as the device 600) may include a selection module 61, a recording module 62, a caching module 63, a search module 64, a replacement module 65, and a generation module 66.

In some embodiments, the modules of the device 600 may be hardware circuits of all or part of the processing engine 1112. The modules of the device 600 may also be implemented as an application or set of instructions read and executed by the processing engine 1112. Further, the modules may be any combination of the hardware circuits and the application or set of instructions. For example, the modules of the device 600 may be the part of the processing engine 1112 when the processing engine 1112 is executing the application or set of instructions.

The selection module 61 may be configured to, for each feature dimension i of an original data set, select a characteristic value Mi from a plurality of feature values of the feature dimension i. In some embodiments, the original data set may include at least one feature dimension.

The original data set may be a data source for data processing, and include at least one feature dimension. The original data set may include, for example, user data of an Internet platform. The Internet platform may be a car hailing application, a website for user transactions, a website for user communication, etc. The user data may include at least one dimensional of feature. Each dimensional of feature may be represented as a feature dimension. Each feature dimension may include at least one feature value. The feature value(s) of a feature dimension may be discrete or continuous.

In some embodiments, the original data set may be a data set related to a plurality of users of a car hailing application. The original data set may include three feature dimensions, such as the age, the gender, and the number of orders in the last 30 days of the users as shown in Table 1. As shown in Table 1, the feature dimension "age" may include feature values of "70s" "80s" and "90s". The feature dimension "gender" may include feature values of "female" and "male". The feature dimension "the number of orders in the last 30 days" may include feature values of "0" and "5".

In some embodiments, the characteristic value Mi of the feature dimension i may be selected according to a preset rule. For example, the characteristic value Mi may be selected based on a statistical distribution of the feature values of the feature dimension i. It should be noted that the characteristic value Mi may be selected by any other means. In some embodiments, a feature value of the feature dimension i with any distribution proportion may be designated as the characteristic value Mi. For example, any one of "70s", "80s", and "90s" may be selected as the characteristic value Mi of the feature dimension "age". In order to improve the cache efficiency, a feature value having the largest distribution proportion may be selected as the characteristic value Mi. It should be understood that any feature value can be selected as the characteristic value Mi to improve the cache efficiency.

The recording module 62 may be configured to record a corresponding relationship between each feature dimension i and the corresponding characteristic value Mi.

The recording module 62 may establish a corresponding relationship between each feature dimension i and the corresponding characteristic value Mi to record the corresponding relationship. In some embodiments, the corresponding relationship may be recorded in a mapping table. For example, if the selected characteristic value Mi of the feature dimension "age" is "70s", a mapping table of age may be established as shown in Table 2. If the selected characteristic value Mi of the feature dimension "gender" is "male", a mapping table of gender may be established as shown in Table 3. If the selected characteristic value Mi of the feature dimension "the number of orders in the last 30 days" is "0", a mapping table of the number of orders in the last 30 days may be established as shown in Table 4. It should be noted that the mapping tables shown in Tables 2, 3 and 4 may be recorded and/or stored jointly in one mapping table.

The caching module 63 may be configured to, for each feature dimension i of the original data set, cache feature value(s) of the feature dimension i other than the corresponding characteristic value Mi into a cache memory.

For example, the characteristic values Mi of the feature dimensions "age", "gender", and "the number of orders in the last 30 days" may be "70s", "male", and "0", respectively. The data cached into the cache memory may be shown as Table 5, in which "NULL" represents that the corresponding feature value(s) are null in the cache memory. It should be noted that the data cached by the caching module 63 may be determined according to the characteristic values Mi selected by the selection module 61. This is not intended to be limiting, and the cached data may not be limited to the example illustrated in Table 5 of the present disclosure.

The search module 64 may be configured to perform a search in the cache memory in response to a query request.

The query request may include a single query condition or a compound query condition. The single query condition may only include one query condition, while the compound query condition may include at least two query conditions. For example, a query request including a single query condition may be a request to search data (e.g., the age, the gender, and the number of orders in the last 30 days) of a user whose ID is "Y001", or a request to search data of all users whose age is "80s". A query request including a compound query condition may be a request to search data of all users whose age is "80s" or "90s", or a request to search data of all users whose age is "80s" and gender is "female".

Upon receiving the query request, the search module 64 may perform the search in the cache memory according to the query request. In some embodiments, if the returned value(s) of the search based on the cached data is not null (that is, the search result of the search does not include one or more empty returns), the processing engine 1112 (e.g., the generation module 66) may generate a query result based on the returned value(s). Merely by way of example, if the query condition of the query request is to search the age of a user whose ID is "Y001", the corresponding query result generated based on the returned value(s) may be "80s". If the query condition of the query request is to search the gender of a user whose ID is "Y002", the corresponding query result generated based on the returned value(s) may be "female". If the query condition of the query request is to search the number of orders in the last 30 days of a user whose ID is "Y003", the corresponding query result generated based on the returned value(s) may be "5". If the query condition of the query request is to search users whose age is "80s" and gender is "female", the corresponding query result generated based on the returned value(s) may be "Y001 and Y002". In some embodiments, if one or more returned values of the search based on the cached data are null (that is, the search result includes one or more empty returns), the replacement module 65 may be activated.

The replacement module 65 may be configured to replace one or more feature values that are null in the cache memory by the corresponding characteristic value(s) Mi based on the query request and the recorded corresponding relationship.

When a returned value of the search based on the cached data is null (or being referred to as "empty"), the replacement module 65 may extract a feature dimension corresponding to the query condition according to the query request. The replacement module 65 may replace the null value(s) of the extracted feature dimension in the cache memory by the corresponding characteristic value Mi based on the recorded corresponding relationship of the extracted feature dimension and its characteristic value Mi.

The generation module 66 may be configured to generate the query result according to the replacement result.

For example, if the query condition of the query request is to search the gender of a user whose ID is "Y003", the corresponding feature value may be null in the cache memory, which may result in a null return value. The replacement module 65 may extract the feature dimension corresponding to the query condition based on the query request, that is, the feature dimension "gender". According to the pre-stored mapping table of gender (e.g., Table 3), the characteristic value of the feature dimension "gender" may be "male". The replacement module 65 may replace the null feature value(s) of the feature dimension "gender" in the cache memory by "male". In that cases, the replacement result of the null feature value(s) of the feature dimension "gender" may be "male". The generation module 66 may then generate the query result based on the replacement result. For example, the query result may be that "the gender of the user whose ID is "Y003" is male".

As another example, if the query condition of the query request is to search the age and the number of orders in the last 30 days of a user whose ID is "Y001", two feature values A and B may be involved. The feature value A may be "80s", which is the age of the user whose ID is "Y001". The feature value B may be null in the cache memory, which is the number of orders in the last 30 days of the user whose ID is "Y001". According to the feature value A, the generation module 66 may generate a query result, e.g., "the age of the user whose ID is "Y001" is 80s". According to the feature value B, the replacement module 65 may extract a feature dimension corresponding to the query condition based on the query request, that is, the feature dimension "the number of orders in the last 30 days". Based on the pre-stored mapping table of the number of orders in the last 30 days (e.g., Table 4), the replacement module 65 may replace the null feature value(s) of the feature dimension "the number of orders in the last 30 days" in the cache memory by "0". In that case, the replacement result of the null feature value(s) of the feature dimension "the number of orders in the last 30 days" may be "0". The generation module 66 may generate the query result based on the replacement result. For example, the query result may be that "the number of orders in the last 30 days of the user whose ID is "Y001" is 0".

Merely by way of example, as shown in Table 5, if there are 5 users, the cached user information may be 7 fields less than the original data set. The mapping table of feature dimensions and characteristic values may need 6 fields for storing comprehensiveness of information of users. Thus, according to the data processing process disclosed in the present disclosure, the cached user information and the mapping table may need 1 field in the cache memory less than the original data set. Compared with caching the original data set, the data processing process disclosed in the present disclosure may save a large number of fields when there are a great number of users (e.g., 200 million) and hundreds of feature dimensions. In this way, the total amount of cached data may be compressed, the cache efficiency may be improved, and the caching cost may be reduced without losing the total amount of information. The saved cache space may be used for caching data of more feature dimensions when the cache capacity is limited, which may improve the integrity of data.

In some embodiments, the data processing process described above may be implemented on an online service system. The online service system may be configured with a cache cluster and an access server. User feature data may be cached in a memory of the cache cluster, which can increase the speed of accessing data. The corresponding relationship of a feature dimension and its characteristic value may be stored locally on the access server, or in another storage device of the online service system. The access server may access the corresponding relationship when a feature value is null in the cache memory. In some embodiments, when the online service system adopts a machine learning or deep learning technique, the online service system may use the data processing process in machine learning or deep learning models, taking advantages of artificial intelligence.

The technical solutions disclosed in the present disclosure may include the following beneficial effects.

For each feature dimension i in the original data set, the selection module 61 may select a characteristic value Mi from a plurality of feature values of the feature dimension i. The recording module 62 may record a corresponding relationship between the feature dimension i and Mi. The caching module 63 may cache feature values of the feature dimension i other than the characteristic value Mi for each feature dimension i of the original data set into a cache memory. In this case, the amount of cached data may be reduced. The search module 64 may perform a search in the cache memory in response to a query request. If returned value(s) of the search based on the cached data is not null, the generation module 66 may generate a query result according to the returned value(s). On the other hand, if the returned value(s) of the search based on the cached data includes a null value, the replacement module 65 may replace one or more feature values that are null in the cache memory by the corresponding characteristic value(s) Mi based on the query request and the recorded corresponding relationship. The generation module 66 may generate a query result based on the replacement result. In this case, the total amount of cached data may be compressed. The cache efficiency may be improved, and the caching cost can be reduced without losing the total amount of information. The saved cache space may be used for caching data of more feature dimensions when the cache capacity is limited, which may improve the integrity of data.

Figure 7:
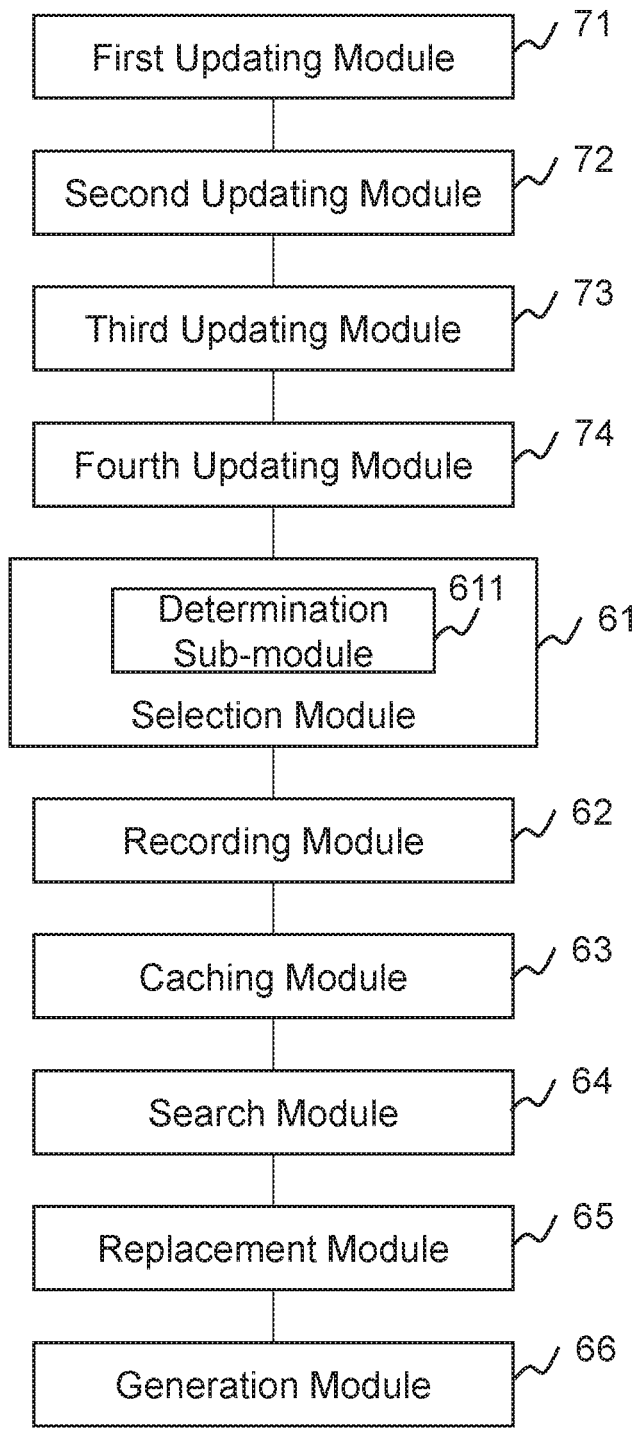
FIG. 7 is a block diagram illustrating an exemplary data processing device according to some embodiments of the present disclosure.

FIG. 7 is a schematic diagram illustrating an exemplary device for data processing 700 according to some embodiments of the present disclosure. In some embodiments, the data processing device 700 (also referred to as device 700) may include a selection module 61, a recording module 62, a caching module 63, a search module 64, a replacement module 65, and a generation module 66. The selection module 61 may include a determination sub-module 611. The determination sub-module 611 may be configured to determine a feature value with the largest distribution proportion among a plurality of feature values of a feature dimension i as a characteristic value Mi of the feature dimension i.

In some embodiments, the modules of the device 700 may be hardware circuits of all or part of the processing engine 1112. The modules of the device 700 may also be implemented as an application or set of instructions read and executed by the processing engine 1112. Further, the modules may be any combination of the hardware circuits and the application or set of instructions. For example, the modules of the device 700 may be the part of the processing engine 1112 when the processing engine 1112 is executing the application or set of instructions.

In some embodiments, the original data set may be shown in Table 1. The determination sub-module 611 may determine a feature value having the largest distribution proportion of each feature dimension i as the characteristic value Mi of the feature dimension i based on a statistical distribution of the feature values of the feature dimension i. For example, for the feature dimension "age", users whose age is "80s" have the largest distribution proportion. Thus, "80s" may be determined as the characteristic value Mi of the feature dimension "age". Similarly, "female" may be determined as the characteristic value Mi of the feature dimension "gender". "0" may be determined as the characteristic value Mi of the feature dimension "the number of orders in the last 30 days". A corresponding relationship between the feature dimension "age" and its corresponding characteristic value Mi (also referred to as a mapping table of age) may be established as shown in Table 6. A corresponding relationship between the feature dimension "gender" and its corresponding characteristic value Mi (also referred to as a mapping table of gender) may be established as shown in Table 7. A corresponding relationship between the feature dimension "the number of orders in the last 30 days" and its corresponding characteristic value Mi (also referred to as a mapping table of the number of orders in the last 30 days) may be established as shown in Table 4 described in FIG. 1.

The caching module 63 may, for each feature dimension i of the original data set, cache feature value(s) of the feature dimension i other than the corresponding characteristic value Mi into a cache memory. For example, the data cached into the cache memory by the caching memory 63 may be shown as Table 8. Details regarding the recording module 62, the search module 64, the replacement module 65, and the generation module 66 may be found elsewhere in the present disclosure (e.g., FIG. 6 and the relevant descriptions thereof).

Merely by way of example, as shown in Table 8, if there are 5 users, the cached user information may be 10 fields less than the original data set. The mapping table of feature dimensions and characteristic values may need 6 fields for storing comprehensiveness of information of users. Thus, according to the data processing process disclosed in the present disclosure, the cached user information and the mapping table may need 4 fields in the cache memory less than the original data set. Compared with caching the original data set, the data processing process disclosed in the present disclosure may save a large number of fields when there are a great number of users (e.g., 200 million) and hundreds of feature dimensions. In this way, the total amount of cached data may be greatly compressed, the cache efficiency may be greatly improved, and the caching cost may be greatly reduced without losing the total amount of information. The saved cache space may be used for caching data of more feature dimensions when the cache capacity is limited, which may improve the integrity of data.

In some embodiments, the feature value having the largest distribution proportion of the feature dimension i may be determined as the characteristic value Mi of the feature dimension i. This may greatly compress the total amount of cached data, improve the cache efficiency, and reduce the caching cost without a loss of the total amount of information. The saved cache space may be used for caching data of more feature dimensions when the cache capacity is limited, which may improve the integrity of data.

It should be noted that the original data set may need to be updated due to actual conditions, such as registrations of new users, massive data updating, policy changes of the platform, etc. Therefore, the corresponding relationship between a feature dimension and its characteristic value may need to be updated to ensure the accuracy of the query result. The update of the original data set and/or the corresponding relationship may be caused by various factors, such as but not limited to a manual input (e.g., an instruction of a user received from a terminal 1130), a time condition (e.g., a requirement of periodical update or real-time update), a certain event (e.g., a massive data updating, registrations of new users), etc.

In some embodiments, as shown in FIG. 7, the data processing device 700 may further include a first updating module 71, a second updating module 72, a third updating module 73, and a fourth updating module 74.

The first updating module 71 may be configured to update the original data set. The updated original data set may be regarded as a new data source on which the data processing device disclosed in the present disclosure in implemented. In some embodiments, the updated original data set may include feature information of one or more new entities. Additionally or alternatively, the updated original data set may include updated feature information of the original entities, such as but not limited to updated feature values of the original feature dimension(s), feature information of one or more new feature dimensions.

The second updating module 72 may be configured to update a distribution proportion of each feature value of the feature dimension i based on the updated original data set.

Merely by way of example, "female" is a feature value that has the largest distribution proportion in the feature dimension "gender". After the original data set is updated, "male" becomes a feature value that has the largest distribution proportion in the feature dimension "gender".

The third updating module 73 may be configured to update the characteristic value Mi based on the updated distribution proportion(s) of feature value(s) in the feature dimension i.

In the above mentioned example, the characteristic value Mi of the feature dimension "gender" may change from "female" to "male".

The fourth updating module 74 may be configured to update the corresponding relationship between i and Mi based on the updated characteristic value Mi.

In the above mentioned example, the corresponding relationship between the feature dimension "gender" and its characteristic value Mi may be updated. For example, the mapping table of gender as shown in Table 7 may be updated to the mapping table of gender as shown in Table 3.

In some embodiments, after the first updating module 71, the second updating module 72, the third updating module 73, and the fourth updating module 74 is executed, the caching module 63 may be activated. The caching module 63 may, for each feature dimension i in the updated original data set, cache feature value(s) other than the corresponding updated characteristic value Mi into the cache memory.

In the present disclosure, the feature value having the largest distribution proportion of a feature dimension i may be determined as the characteristic value Mi of the feature dimension i, which may greatly compress the total amount of cached data, improve the cache efficiency, and reduce the caching cost without losing the total amount of information. Besides, the cached data and the corresponding relationship(s) between feature dimension(s) and the corresponding characteristic value(s) may be updated based on the updated original data set, which may ensure the accuracy of the query result.

Figure 8:
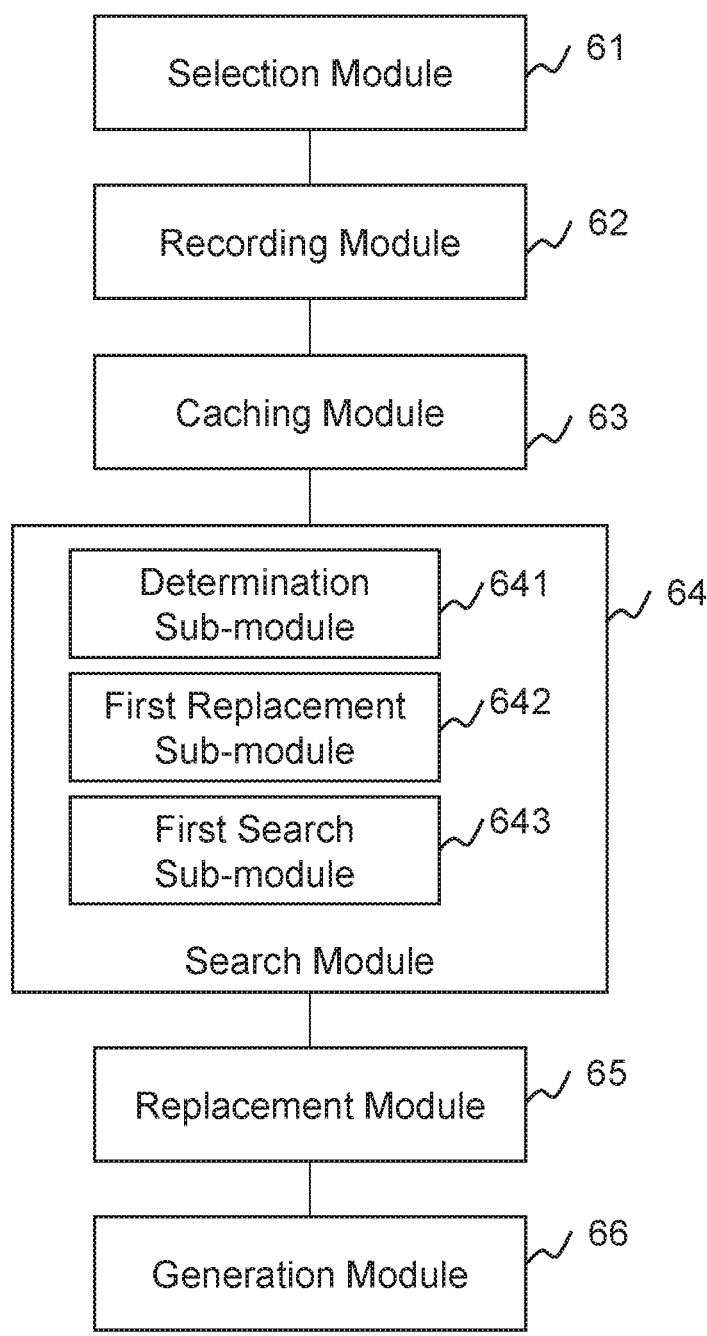
FIG. 8 is a block diagram illustrating an exemplary data processing device according to some embodiments of the present disclosure.

FIG. 8 is a schematic diagram illustrating an exemplary device for data processing 800 according to some embodiments of the present disclosure. In some embodiments, the data processing device 800 (also referred to as the device 800) may include a selection module 61, a recording module 62, a caching module 63, a search module 64, a replacement module 65, and a generation module 66.

The modules of the device 800 may be hardware circuits of all or part of the processing engine 1112. The modules of the device 800 may also be implemented as an application or set of instructions read and executed by the processing engine 1112. Further, the modules may be any combination of the hardware circuits and the application or set of instructions. For example, the modules of the device 800 may be the part of the processing engine 1112 when the processing engine 1112 is executing the application or set of instructions.

The selection module 61 may be configured to, for each feature dimension i of an original data set, select a characteristic value Mi from a plurality of feature values of the feature dimension i.

The recording module 62 may be configured to record a corresponding relationship between each feature dimension i and the corresponding characteristic feature Mi.

The caching module 63 may be configured to, for each feature dimension I of the original data set, cache feature value(s) of the feature dimension i other than the corresponding characteristic value Mi into a cache memory.

Details regarding the selection module 61, the recording module 62, and the caching module 63 may be found elsewhere in the present disclosure (e.g., FIG. 6 and the relevant descriptions thereof).

In some embodiments, the original data set may be shown in Table 1. The corresponding relationships between feature dimensions and the corresponding characteristic values may be shown in Tables 4, 6, and 7. The cached data may be shown in Table. 8.

The search module 64 may be configured to perform a search in the cache memory in response to a query request.

The search module 64 may include a determination sub-module 641, a first replacement sub-module 642, and a first search sub-module 643.

The determination sub-module 641 may be configured to, in response to a query request, determine whether the query request includes a query condition that includes a feature dimension i and its corresponding characteristic value Mi based on the recorded corresponding relationship(s). In response to a determination that the query request includes the query condition that includes the feature dimension i and its corresponding characteristic value Mi, the first replacement sub-module 642 may be activated.

Merely by way of example, a query request is to search the IDs of users who satisfy a query condition "age=80s". Upon receiving the query request, the determination sub-module 641 may determine that the query condition includes the feature dimension "age" and its characteristic value "80s" according to the mapping table of age as shown in Table 6. Then the first replacement sub-module 642 may be activated.

The first replacement sub-module 642 may be configured to replace the characteristic value Mi in the query condition of the query request by a null value. In other words, the first replacement sub-module 642 may update the query request by an empty entry (e.g., the null value). The updated query request may include the feature dimension i and the empty entry.

The first search sub-module 643 may be configured to perform a search in the cache memory based on the updated query request In the above mentioned example, the original query condition for searching users' ID may be "age=80s", which may be updated to a query condition "age=null". Therefore, the processing engine 1112 (e.g., the generation module 66) may generate a query result that satisfies the original query condition by performing the search in the cache memory based on the updated query request. For example, the query result may be Y001, Y002, and Y003.

The replacement module 65 may be configured to replace one or more feature values that are null in the cache memory by corresponding characteristic value(s) Mi based on the query request and the recorded corresponding relationship(s).

The generation module 66 may be configured to generate a query result based on the replacement result.

Details regarding the replacement module 65 and the generation module 66 may be found elsewhere in the present disclosure (e.g., FIG. 6 and the relevant descriptions thereof).

Merely by way of example, the query request is to search data (e.g., the gender, the age, and the number of orders in the last 30 days) of all users whose satisfies query conditions "age=80s" and "gender=male". Upon receiving the query request, the determination sub-module 641 may determine that the query request includes a query condition including the feature dimension "age" and the characteristic value "80s" based on the mapping table of age as shown in Table 6. The first replacement sub-module 642 may replace the characteristic value "80s" in the query condition of the query request by a null value. Thus, the updated query request may be to search data (e.g., the gender, the age, and the number of orders in the last 30 days) of all users whose satisfies updated query conditions "age=Null" and "gender=male". The first search sub-module 643 may perform the search in the cache memory based on the updated query request. The query result may be shown in Table 9.

In the present disclosure, if the query request includes a query condition including a feature dimension i and its corresponding characteristic value Mi, the processing engine 1112 (e.g., the first replacement sub-module 642) may update the query request. The processing engine 1112 (e.g., the first search sub-module 643) may then perform a search in the cache memory based on the updated query request. This may avoid a failure in obtaining the query result according to the original query request.

Figure 9:
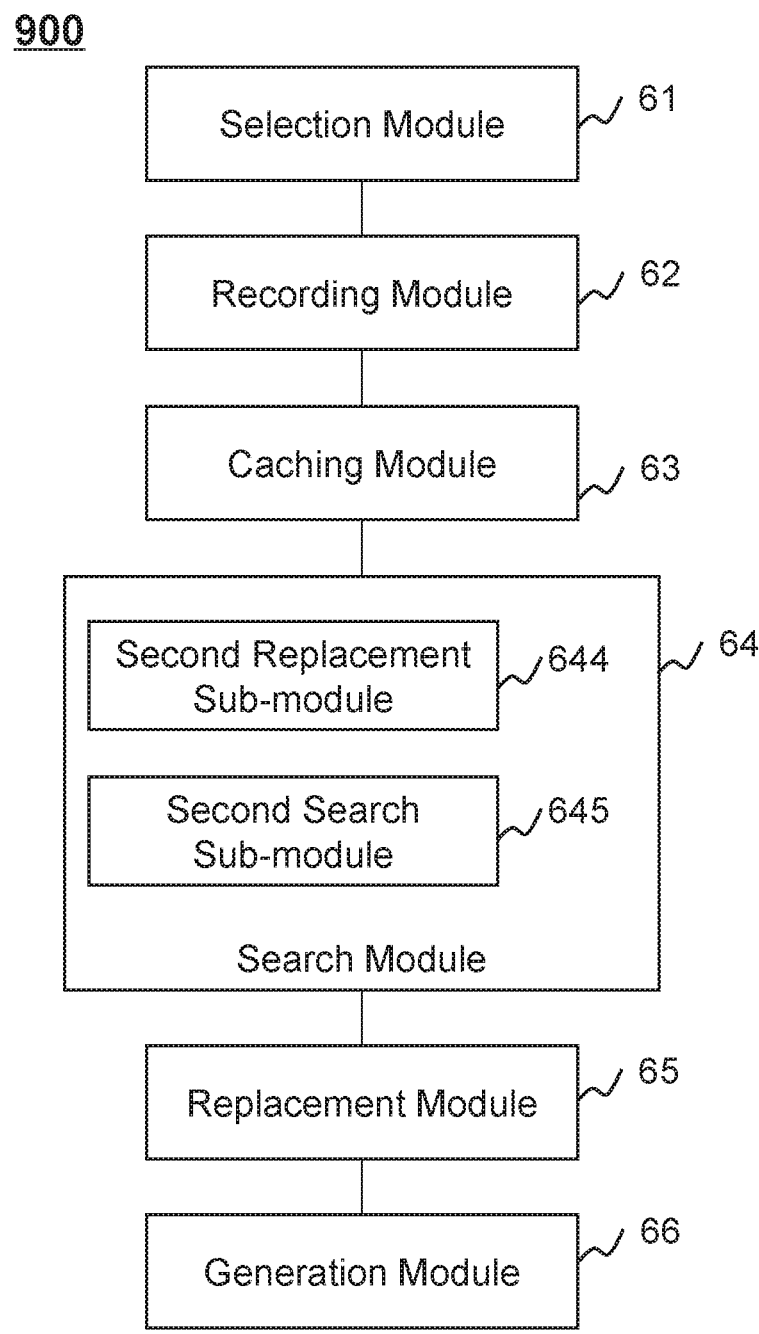
FIG. 9 is a block diagram illustrating an exemplary data processing device according to some embodiments of the present disclosure.

FIG. 9 is a schematic diagram illustrating an exemplary device for data processing 900 according to some embodiments of the present disclosure. In some embodiments, the data processing device 900 (also referred to as the device 900) may include a selection module 61, a recording module 62, a caching module 63, a search module 64, a replacement module 65, and a generation module 66.

The modules of the device 900 may be hardware circuits of all or part of the processing engine 1112. The modules of the device 900 may also be implemented as an application or set of instructions read and executed by the processing engine 1112. Further, the modules may be any combination of the hardware circuits and the application or set of instructions. For example, the modules of the device 900 may be the part of the processing engine 1112 when the processing engine 1112 is executing the application or set of instructions.

The selection module 61 may be configured to, for each feature dimension i of an original data set, select a characteristic value Mi from a plurality of feature values of the feature dimension i.

The recording module 62 may be configured to record a corresponding relationship between each feature dimension i and the corresponding characteristic feature Mi.

The caching module may be configured to, for each feature dimension i of the original data set, cache feature value(s) of the feature dimension i other than the corresponding characteristic value Mi into a cache memory.

Details regarding the selection module 61, the recording module 62, and the caching module 63 may be found elsewhere in the present disclosure (e.g., FIG. 6 and the relevant descriptions thereof).

In some embodiments, the original data set may be shown in Table 1. The corresponding relationships between feature dimensions and the corresponding characteristic values may be shown in Tables 4, 6, and 7. The cached data may be shown in Table. 8.

The search module 64 may be configured to perform a search in the cache memory in response to a query request.

The search module 64 may include a second replacement sub-module 644, and a second search sub-module 645.

The second replacement sub-module 644 may be configured to replace null feature value(s) in the cache memory by corresponding characteristic value(s) Mi based on the corresponding relationship(s).

For example, the second replacement sub-module 644 may replace feature values that are "NULL" in Table 8 by the corresponding characteristic values according to the corresponding relationships as shown in Tables 4, 6 and 7. Merely by way of example, the second replacement sub-module 644 may replace the "Null" feature value(s) of the feature dimension "age" by "80s". The second replacement sub-module 644 may replace the "Null" feature value(s) of the feature dimension "gender" by "female". The second replacement sub-module 644 may replace the "Null" feature value(s) the feature dimension "the number of orders in the last 30 days" by "0". The cached data after the replacement may be shown in Table 1.

The second search sub-module 645 may be configured to perform a search in the cache memory based on the query request.

The replacement module 65 may be configured to replace one or more feature values that are null in the cache memory by corresponding characteristic value(s) Mi based on the query request and the recorded corresponding relationship(s).

The generation module 66 may be configured to generate a query result based on the replacement result.

Details regarding the replacement module 65 and the generation module 66 may be found elsewhere in the present disclosure (e.g., FIG. 6 and the relevant descriptions thereof).

Merely by way of example, the query request may include a query condition to search the total number of orders in the last 30 days of all users whose age is "80s" and gender is "female". Upon receiving the query request and according to the corresponding relationships in Tables 4, 6 and 7, the second replacement sub-module 644 may replace the Null feature value(s) of the feature dimension "age" by "80s", the Null feature value(s) of the feature dimension "gender" by "female", and the Null feature value(s) of the feature dimension "the number of orders in the last 30 days" by "0". The cached data after the replacement may be shown in Table 1. According to Table 1, data of users who satisfy the query condition of the query request may be shown in Table 10. As shown in Table 10, users "Y001" and "Y002" satisfy the query condition of the query request. The processing engine 1112 (e.g., the generation module 66) may sum up the numbers of orders in the last 30 days of "Y001" and "Y002" to generate the query result. Since the numbers of orders in the last 30 days of "Y001" and "Y002" are both 0, the query result may be 0.

In the present disclosure, upon receiving the query request, the processing engine 1112 (e.g., the second replacement sub-module 644) may replace the null feature value(s) in the cache memory by corresponding characteristic value(s) Mi according to the recorded corresponding relationship(s). The processing engine 1112 (e.g., the second search sub-module 645) may then perform a search in the cache memory based on the query request, which can avoid a failure in obtaining a query result according to the query request.

In some embodiments, the second replacement sub-module 644 of the device 900 may be further configured to determine whether the query request includes a query condition that includes a feature dimension i based on the recorded corresponding relationship(s). In response to a determination that the query request includes the query condition that includes the feature dimension i, the second replacement sub-module 644 may replace null feature value(s) corresponding to the feature dimension i in the cache memory by the corresponding characteristic value(s) Mi.

In some embodiments, the original data set may be shown in Table 1. The corresponding relationships between feature dimensions and the corresponding characteristic values may be shown in Tables 4, 6, and 7. The cached data may be shown in Table. 8. The second replacement sub-module 644 may determine whether the query condition of the query request includes at least one of the feature dimensions "gender", "age", or "the number of orders in the last 30 days". If the query condition of a query request includes the feature dimension "age", the second replacement sub-module 644 may replace the "Null" feature value(s) of the feature dimension "age" as shown in Table 8 by "80s". If the query condition of a query request includes the feature dimension "gender", the second replacement sub-module 644 may replace the "Null" feature value(s) of the feature dimension "gender" as shown in Table 8 by "female". If the query condition of a query request includes the feature dimension "the number of orders in the last 30 days", the second replacement sub-module 644 may replace the "Null" feature value(s) of the feature dimension "the number of orders in the last 30 days" as shown in Table 8 by "0".

Merely by way of example, the query request may include a query condition to search the total number of orders in the last 30 days of all users whose age is "80s" and gender is "female". Upon receiving the query request, according to the corresponding relationships in Tables 6 and 7, the second replacement module 644 may replace the "Null" feature value(s) of the feature dimension "age" as shown in Table 8 by "80s", and the "Null" feature value(s) of the feature dimension "gender" as shown in Table 8 by "female". The cached data after the replacement may be shown in Table 11. Based on Table 11, data of users who satisfy the query condition of the query request may be shown in Table 12. As shown in Table 12, users "Y001" and "Y002" satisfy the query condition of the query request. The generation module 66 may sum up the numbers of orders in the last 30 days of Y001 and Y002 to generate the query result. According to Table 4, since the numbers of orders in the last 30 days of "Y001" and "Y002" are both 0, the query result may be 0.

In the present disclosure, in response to a query request, the second replacement sub-module 644 may determine whether the query condition of the query request includes a feature dimension i based on the recorded corresponding relationship. In response to a determination that the query condition includes the feature dimension i, the second replacement sub-module 644 may replace null feature value (s) of the feature dimension i in the cache memory by the corresponding characteristic value Mi. The second search sub-module 645 may then perform a search in the cache memory based on the query request. The devices herein described may reduce the amount of data replacement and avoid a failure in obtaining a query result since data in the cache memory are replaced according to the query request.

In the present disclosure, the embodiments of device(s) and process(s) may complement and reinforce each other without conflict. The embodiments of device(s) are provided merely for illustration purposes. The units (or modules) described as separate components may or may not be physically separated. The components shown as units (or modules) may or may not be physical units (or modules). Thus, these components may be located in one place or distributed on a plurality of network units. Some or all modules may be selected to implement the present disclosure according to actual needs. Those skilled in the art can understand and implement the embodiments without creative efforts.

The present disclosure also provides a computer storage medium. The computer storage medium may store computer programs. When executed by a processor, the computer programs may cause a computer device to perform the following operations.

For each feature dimension i of an original data set, the computer programs may cause the computer device to select a characteristic value Mi from a plurality of feature values of the feature dimension i. The computer programs may cause the computer device to record a corresponding relationship between each feature dimension i and its characteristic value Mi. The original data set may include at least one feature dimension.

For each feature dimension i of the original data set, the computer programs may cause the computer device to cache feature value(s) of the feature dimension i other than the corresponding characteristic value Mi into a cache memory.

The computer programs may cause the computer device to perform a search in the cache memory in response to a query request.

The computer programs may cause the computer device to replace one or more feature values that are null in the cache memory by the corresponding characteristic value(s) Mi based on the query request and the recorded corresponding relationship(s). The computer programs may further cause the computer device to generate a query result based on the replacement result.

The processes and system herein described may be used to improve the functions of computers (or referred to as servers) in a wide variety of application scenarios. In essence, by reducing the data and/or values that need to be cached, the processes and system in the current disclosure improve the efficiency of using the cache memory, especially when dealing with large data sets. The computers may improve their speed in processing data and enable faster return for searches and inquiries.

Figure 10:
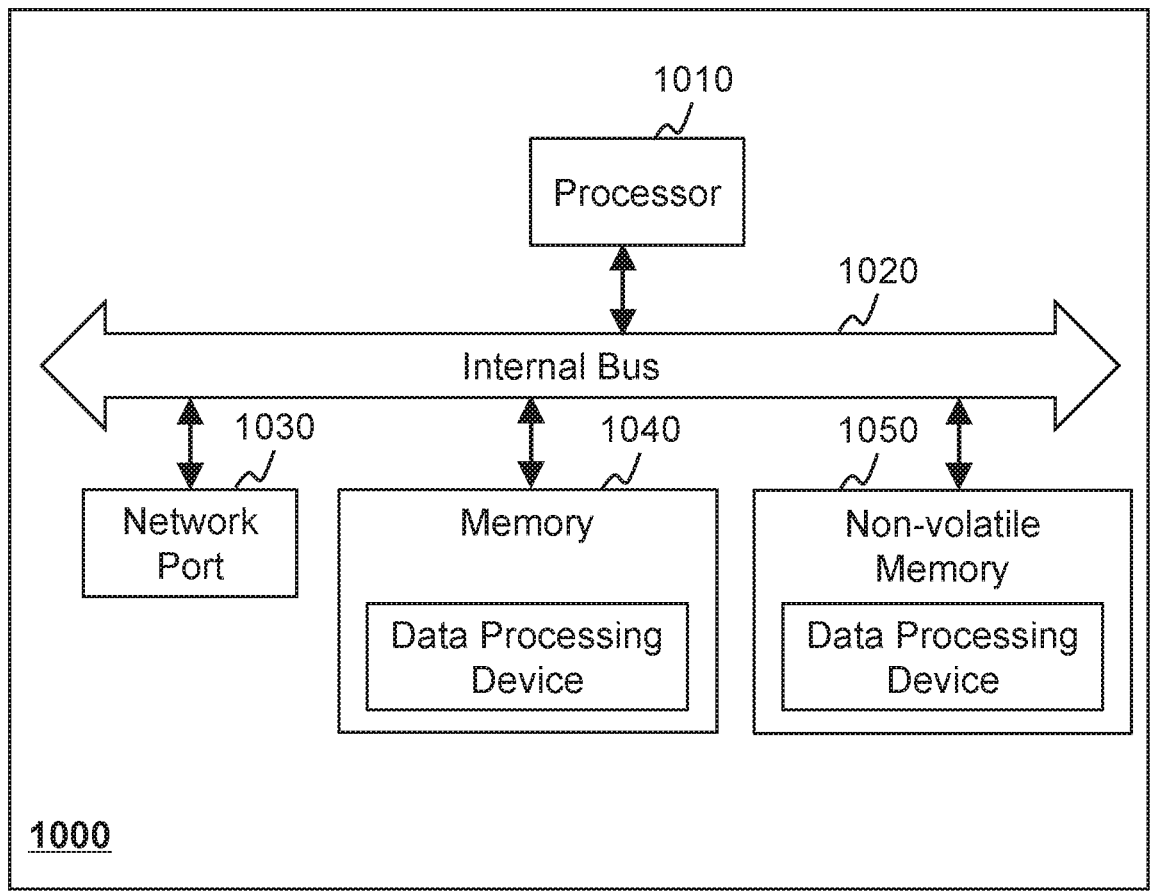
FIG. 10 is a schematic diagram of an exemplary mobile device according to some embodiments of the present disclosure.

FIG. 10 is a schematic diagram of an exemplary electronic device 1000 according to some embodiments of the present disclosure. As shown in FIG. 10, at a hardware level, the electronic device 1000 may include a processor 1010, an internal bus 1020, a network port 1030, a memory 1040, a non-volatile memory 1050, and other hardware components (not shown in FIG. 10). The processor 1010 may read computer programs from the non-volatile memory 1050 into the memory 1040, and run the computer programs in the memory 1040, forming a data processing device at a logical level. It should be noted that the present disclosure does not exclude other implementations (e.g., a logic element implementation, a combination implementation of hardware and software) other than the software implementation. That is, an execution subject of the following process may not be limited to logic units, and may also be hardware or logic elements.

The processor 1010 may be configured to, for each feature dimension i of an original data set, select a characteristic value Mi from a plurality of feature values of the feature dimension i. The processor 1010 may also record a corresponding relationship between each feature dimension i and its characteristic value Mi. The original data set may include at least one feature dimension.

The processor 1010 may also be configured to, for each feature dimension i of the original data set, cache feature value(s) of the feature dimension i other than the corresponding characteristic value Mi into a cache memory.

The processor 1010 may also be configured to perform a search in the cache memory in response to a query request.

The processor 1010 may further be configured to replace one or more feature values that are null in the cache memory by the corresponding characteristic value(s) Mi based on the query request and the recorded corresponding relationship(s). The processor 1010 may then generate a query result based on the replacement result.

FIG. 11 is a block diagram illustrating an exemplary data processing system 1100 according to some embodiments of the present disclosure. In some embodiments, the data processing system 1100 may be a platform in which information related to entities in the platform is stored and/or processed. In some embodiments, the platform may be an online platform providing an online service, such as an entertainment service, a search service, a communication service, an e-commerce service, or the like, or any combination thereof. In certain embodiments, the data processing system 1100 may be an online platform providing an Online to Offline (O2O) service, such as but not limited to a transportation service (e.g., a taxi-hailing service, a chauffeur service, an express car service, a carpool service, a bus service, a driver hire service, and a shuttle service), a meal booking service, an online shopping service, or the like. The data processing system 1100 may include a server 1110, a network 1120, a terminal 1130, a storage device 1140, and a cache memory 1150.

In some embodiments, the server 1110 may be a single server or a server group. The server group may be centralized, or distributed (e.g., the server 1110 may be a distributed system). In some embodiments, the server 1110 may be local or remote. For example, the server 1110 may access information and/or data stored in the terminal 1130, the storage device 1140, and/or the cache memory 1150 via the network 120. As another example, the server 1110 may be directly connected to the terminal 1130, the storage device 1140 and/or the cache memory 1150 to access stored information and/or data. In some embodiments, the server 1110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 1110 may be implemented on a computing device 1200 having one or more components illustrated in FIG. 12 in the present disclosure.

In some embodiments, the server 1110 may include a processing engine 1112. In some embodiments, the processing engine 11112 may include one or more processing engines (e.g., single-core processing engine(s) or multi-core processor(s)). Merely by way of example, the processing engine 1112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, at least part of the server 1110 (e.g., the processing engine 112) may be integrated into the terminal 1130.

The network 1120 may facilitate exchange of information and/or data. In some embodiments, one or more components of the data processing system 1100 (e.g., the server 1110, the terminal 1130, the storage device 1140, and the cache memory 1150) may transmit information and/or data to other component(s) of the data processing system 1100 via the network 1120. For example, the server 1110 may receive a request from the terminal 1130 via the network 1120. In some embodiments, the network 1120 may be any type of wired or wireless network, or combination thereof. Merely by way of example, the network 1120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 1120 may include one or more network access points. For example, the network 1120 may include wired or wireless network access points such as base stations and/or internet exchange points 1120-1, 1120-2, through which one or more components of the data processing system 1100 may be connected to the network 1120 to exchange data and/or information.

In some embodiments, the terminal 1130 may include a mobile device 1130-1, a tablet computer 1130-2, a laptop computer 1130-3, a built-in device in a vehicle 1130-4, or the like, or any combination thereof. In some embodiments, the mobile device 1130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift, a HoloLens, a Gear VR, etc. In some embodiments, the built-in device in the vehicle 1130-4 may include an onboard computer, an onboard television, etc. In some embodiments, the terminal 1130 may communicate with the server 1110 via a wireless connection. For example, the terminal 1130 may receive information and/or instructions inputted by a user, and send the received information and/or instructions to the server 1110 via the network 1120.

The storage device 1140 may store data and/or instructions. In some embodiments, the storage device 1140 may store data obtained from the terminal 1130. In some embodiments, the storage device 1140 may store data and/or instructions that the server 1110 may execute or use to perform exemplary methods described in the present disclosure. Merely by way of example, the storage device 1140 may store a set of instructions related to data querying. As another example, the storage device 1140 may store feature information of a plurality of entities of the data processing system 1100. In some embodiments, the storage device 1140 may include a mass storage, removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 1140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 1140 may be connected to the network 1120 to communicate with one or more components of the data processing system 1100 (e.g., the server 1110, the terminal 1130, or the cache memory 1150). One or more components of the data processing system 1100 may access the data or instructions stored in the storage device 1140 via the network 1120. In some embodiments, the storage device 1140 may be directly connected to or communicate with one or more components of the data processing system 1100 (e.g., the server 1110, the requester terminal 1130, the cache memory 1150). In some embodiments, the storage device 1140 may be part of the server 1110 or the terminal 1130.

The cache memory 1150 may store data and/or instructions. The cache memory 1150 may be a random access memory (RAM) that a computer processor (e.g., the processing engine 1112) can access more quickly than it accesses the storage device 1140. In some embodiments, the cache memory 1150 may store copies of instructions and/or data that are used frequently by the computer processor (e.g., the processing engine 1112), such that the computer processor may access the data more efficiently from the cache memory 1150 rather than the storage device 1140.

In some embodiments, the cache memory 1150 may be connected to the network 1120 to communicate with one or more components of the data processing system 1100 (e.g., the server 1110, the terminal 1130, or the storage device 1140). One or more components of the data processing system 1100 may access the data or instructions stored in the cache memory 1150 via the network 1120. In some embodiments, the cache memory 1150 may be directly connected to or communicate with one or more components of the data processing system 1100 (e.g., the server 1110, the requester terminal 1130, the storage device 1140). In some embodiments, the cache memory 1150 may be part of the server 1110. For example, the cache memory 1150 may be directly integrated in the processing engine 1112. As another example, the cache memory 1150 may be placed on a separate chip in the server 1110 that is connected to the processing engine 1112. In some embodiments, the cache memory 1150 may be integrated into the terminal 1130. For example, the cache memory 1150 may be integrated into a processor of the terminal 1130, or be integrated into the terminal 1130 and communicated with the processor of the terminal 1130.

One of ordinary skill in the art would understand that when an element (or component) of the data processing system 1100 performs, the element may perform through electrical signals and/or electromagnetic signals. For example, when the terminal 1130 transmits out a request to the server 1110, a processor of the terminal 1130 may generate an electrical signal encoding the request. The processor of the terminal 1130 may then transmit the electrical signal to an output port. If the terminal 1130 communicates with the server 1110 via a wired network, the output port may be physically connected to a cable, which further may transmit the electrical signal to an input port of the server 1110. If the terminal 1130 communicates with the server 1110 via a wireless network, the output port of the terminal 1130 may be one or more antennas, which convert the electrical signal to electromagnetic signal. Within an electronic device, such as the requester terminal 1130, and/or the server 1110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

In some embodiments, the storage device 1140 may store a set of instructions for querying data and feature information of a plurality of entities of the data processing system 1100. In some embodiments, an entity may refer to something having a real existence, as a subject or as an object, currently or potentially, concretely or abstractly, physically or virtually. The feature information may include at least one feature dimension for each entity, and at least one feature value for each feature dimension. In some embodiments, the plurality of entities may include at least one of service requesters, service providers, or service orders in an O2O service system. Merely by way of example, the plurality of entities may include a plurality of service requesters of a car-hailing service system. The feature information may include feature values of a plurality of feature dimensions (e.g., the gender, the age, the phone number, the address, the number of historical service orders) of each service requester. In some embodiments, the feature information stored in the storage device 1140 may also be referred to as an original data set for analysis.

A processor (e.g., the processing engine 1112, a processor of the terminal 1130) may be in communication of the storage device 1140 and execute the set of instructions. When executing the set of instructions, the processor may cause the data processing system 1100 or a component thereof to perform a data querying process. In some embodiments, the processing engine 1112 may be configured to determine a characteristic value of a selected feature dimension among feature values of the selected feature dimension of the plurality of entities. The processing engine 1112 may also establish a corresponding relationship between the characteristic value and the selected feature dimension. The selected feature dimension may be any one of the at least one feature dimension of the plurality of entities. In some embodiments, the processing engine 1112 may select the characteristic value of the selected feature dimension from the feature values of the selected feature dimension of the entities randomly or according to a selection rule. In certain embodiments, the processing engine 1112 may determine a mode of the feature values of the selected feature dimension of the entities as the characteristic value of the selected feature dimension.

After the characteristic value of the selected feature dimension is determined, the processing engine 1112 may cache the feature value of the selected feature dimension into the cache memory 1150 for each entity whose feature value of the selected feature dimension is unequal to the characteristic value. On the other hand, for each entity having a feature value of the selected feature dimension being equal to the characteristic value, the processing engine 1112 may leave the corresponding feature value of the selected feature dimension without caching. If a feature value of a feature dimension of an entity is not cached into the cache memory 1150, the corresponding feature value may be recorded as an empty entry (e.g., a Null value) in the cache memory 1150. Merely by way of example, if the characteristic value of the feature dimension "age" is 30, the processing engine 1112 may cache the feature value of "age" of each entity whose age is not 30 into the cache memory 1150, while leave the feature value of "age" for each entity whose age is 30 without caching. The age of an entity whose age is not cached into the cache memory 1150 may be recorded as "Null" in the cache memory 1150.

The processing engine 1112 may receive a query request related to the plurality of entities. In some embodiments, the query request may include one or more query conditions used to narrow query request to entities who fulfill the query condition(s). For example, the query request may be a request to search feature information of entities who fulfill a query condition "age=30". In some embodiments, the query request may be inputted by a user via the terminal 1130.

In some embodiments, in response to the query request, the processing engine 1112 may perform a first search in the cache memory to produce a first search result. For example, the processing engine 1112 may produce the first search result by searching information of entities who fulfill the query condition(s) of the query request. In some embodiments, the processing engine 1112 may determine whether the first search result includes an empty return. In response to a determination that the first search result does not include an empty return, the processing engine 1112 may directly generate a query result based on the first search result.

On the other hand, in response to a determination that the first search result includes an empty return, the processing engine 1112 may generate the query result based on the first search result and the corresponding relationship between the selected feature dimension and the characteristic value. In some embodiments, the processing engine 1112 may replace one or more empty returns related to the selected feature dimension in the first search result with the characteristic value of the selected feature dimension. The processing engine 1112 may further generate the query result based on the replaced first search result. In some embodiments, in response to a determination that the first search result includes an empty return, the processing engine 1112 may cache the characteristic value of the selected feature dimension into the cache memory 1150 based on the corresponding relationship for each entity whose selected feature dimension having an empty entry. The processing engine 1112 may perform a second search in the cache memory in response to the query request to produce a second search result, and generate the query result based on the second search result. For illustration purposes, an example of generating a query result in response to a query request of searching the age of a user whose ID is "001" is described. Assuming that the age of the user "001" is equal to the characteristic value of the feature dimension "age", the first search result may indicate that the age of user "001" is "Null". In some embodiments, the processing engine 1112 may replace the "Null" of the feature dimension "age" in the first search result by the corresponding characteristic value. The processing engine 1112 may then generate the query result based on replaced first search result. Alternatively, the processing engine 1112 may cache the characteristic value of "age" into the cache memory 1150 for each user whose age is equal to the characteristic value. The processing engine 1112 may then perform a second search in the cache memory 1150, find the age of the user "001", and generate the query result accordingly.

In some embodiments, upon receiving the query request and before performing the first search in the cache memory 1150, the processing engine 1112 may cache the characteristic value of the selected feature dimension into the cache memory for each entity whose selected feature dimension has an empty entry. The processing engine 1112 may then perform the first search in the cache memory after the characteristic value of the selected feature dimension is cached. This can avoid an undesirable first search result that includes an empty return.

In some embodiments, the processing engine 1112 may further analyze the query request before performing the first search. For example, the processing engine 1112 may determine whether the query request is related to the selected feature dimension and the corresponding characteristic value. In response to a determination that the query request is related to the selected feature dimension and the corresponding characteristic value, the processing engine 1112 may update the query request. The updated query request may include the feature dimension and an empty entry. The processing engine 1112 may then perform the first search in the cache memory based on the updated query request. For example, if the characteristic value of "age" is 30 and the query request is to search the ID of users whose age is 30, the processing engine 1112 may determine that the query request is related to the feature dimension "age" and its characteristic value, so that the processing engine 1112 may update the query request to search the ID of users whose age is "Null". In this way, the processing engine 1112 may find the users whose age is equal to "Null", that is, the characteristic value of age in the cache memory 1150. In some embodiments, the processing engine 1112 may determine whether the query request is related to the selected feature dimension. In response to a determination that the query request is related to the selected feature dimension, the processing engine 1112 may cache the characteristic value of the selected feature dimension into the cache memory for each entity whose selected feature has an empty entry. The processing engine 1112 may then perform the first search in the cache memory in response to the query request. Details regarding the generation of the query result based on the analysis of the query request may be found elsewhere in the present disclosure (e.g., FIGS. 3 and 5 and the relevant descriptions thereof).

In some embodiments, the feature information stored in the storage device 1140 may be updated according to different situations. For example, the feature information may be updated periodically. As another example, the feature information may be updated under an instruction of a user or when a number of new entities appear in the data processing system 1100. In some embodiments, the processing engine 1112 may update the feature information of the plurality of entities in the storage device 1140, and determine an updated characteristic value of the selected feature dimension based on the updated feature information. The processing engine 1112 may also perform the data processing process disclosed in the present disclosure based on the updated characteristic value. Details regarding the update of the feature information may be found elsewhere in the present disclosure (e.g., FIG. 2 and the relevant descriptions thereof).

Figure 12:
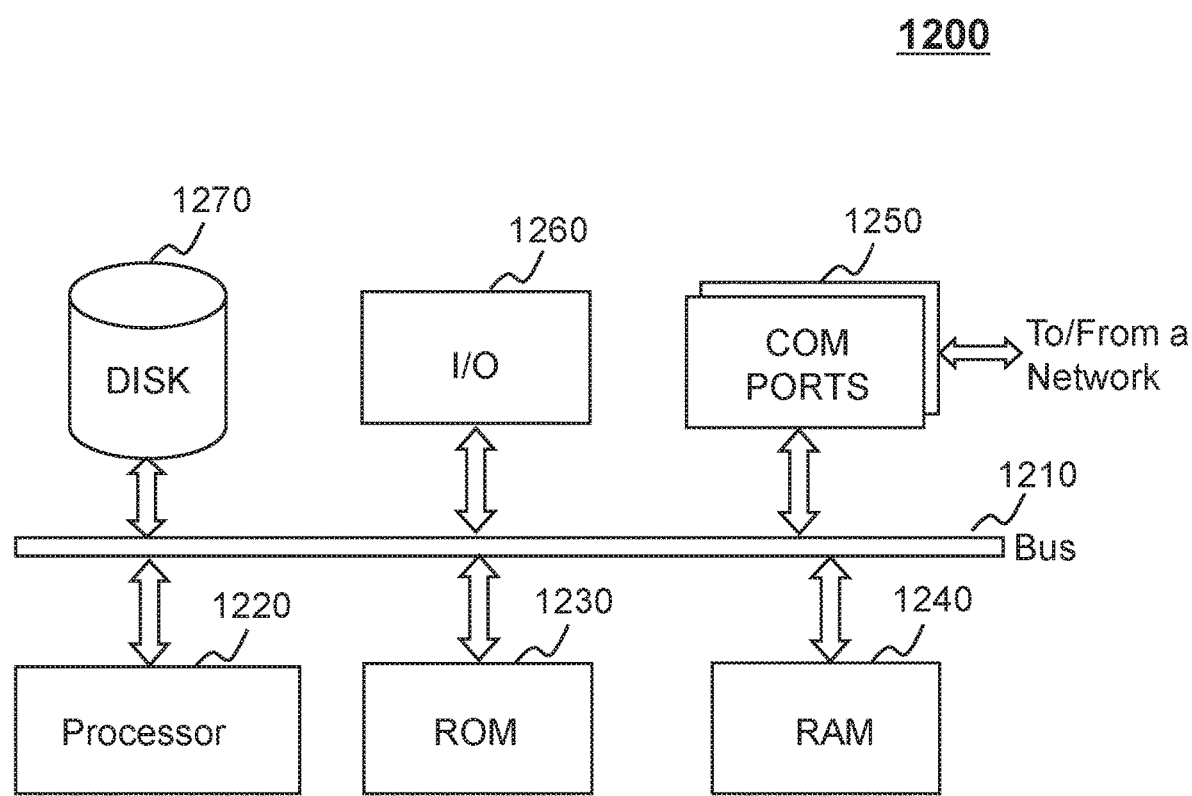
FIG. 12 is a schematic diagram illustrating exemplary hardware and/or software components of a computing device according to some embodiments of the present disclosure.

FIG. 12 illustrates a schematic diagram of an exemplary computing device 1200 according to some embodiments of the present disclosure. The computing device 1200 may be a computer, such as the server 1110 in FIG. 11 and/or a computer with specific functions, configured to implement any particular system according to some embodiments of the present disclosure. The computing device 1200 may be configured to implement any components that perform one or more functions disclosed in the present disclosure. For example, the server 1110 may be implemented in hardware devices, software programs, firmware, or any combination thereof of a computer like computing device 1200. For brevity, FIG. 12 depicts only one computing device. In some embodiments, the functions of the computing device, providing function that recommending pick-up locations may require, may be implemented by a group of similar platforms in a distributed mode to disperse the processing load of the system.

The computing device 1200 may include a communication port 1250 that may connect with a network that may implement the data communication. The computing device 1200 may also include a processor 1220 that is configured to execute instructions and includes one or more processors. The schematic computer platform may include an internal communication bus 1210, different types of program storage units and data storage units (e.g., a hard disk 1270, a read-only memory (ROM) 1230, a random-access memory (RAM) 1240), various data files applicable to computer processing and/or communication, and some program instructions executed possibly by the processor 1220. The computing device 1200 may also include an I/O device 1260 that may support the input and output of data flows between computing device 1200 and other components. Moreover, computing device 1200 may receive programs and data via the communication network. In some embodiments, the computing device 1200 may further include a cache memory (not shown in FIG. 12) in communication with the processor 1220. In some embodiments, the cache memory may be integrated into the processor 1220 or the RAM 1240.

Figure 13:
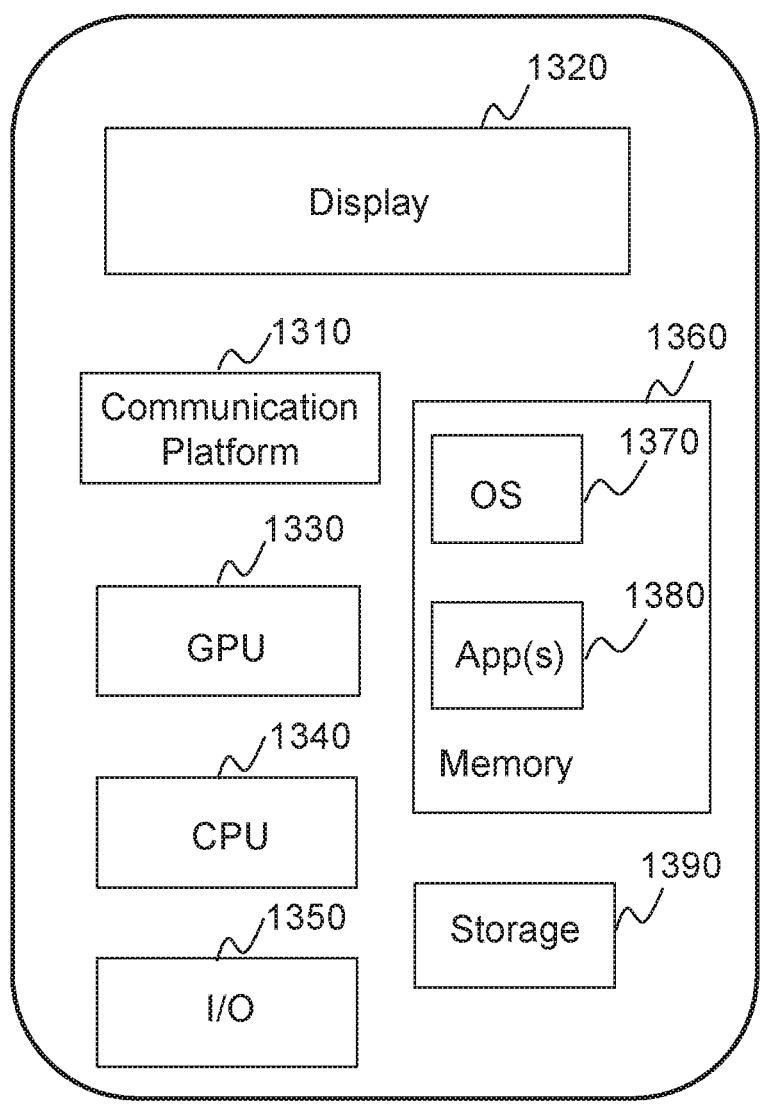
FIG. 13 is a schematic diagram illustrating exemplary hardware and/or software components of a mobile device on which a terminal may be implemented according to some embodiments of the present disclosure.

FIG. 13 is a schematic diagram illustrating exemplary hardware and/or software components of an exemplary mobile device on which a terminal 1130 may be implemented according to some embodiments of the present disclosure. As illustrated in FIG. 13, the mobile device 1300 may include a communication platform 1310, a display 1320, a graphic processing unit (GPU) 1330, a central processing unit (CPU) 1340, an I/O 1350, a memory 1360, a mobile operating system (OS) 1370, one or more applications 1380, and a storage 1390. In some embodiments, any other suitable component, including but not limited to a system bus or a controller (not shown), may also be included in the mobile device 1300. In some embodiments, a mobile operating system 1370 (e.g., iOS™, Android™, Windows Phone™, etc.) and one or more applications 1380 may be loaded into the memory 1360 from the storage 1390 in order to be executed by the CPU 1340. The applications 1380 may include a browser or any other suitable mobile apps for receiving and rendering information relating to data processing or other information from the data processing system 1100. User interactions with the information stream may be achieved via the I/O 1350 and provided to the storage device 1140, the server 1110 and/or other components of the data processing system 1100. In some embodiments, the mobile device 1300 may further include a cache memory in communication with the CPU 1340 and the storage 1390. In some embodiments, the cache memory may be integrated into the CPU 1340 or the memory 1360.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for querying data, comprising:
   at least one storage medium including a set of instructions and feature information of a plurality of entities, the feature information including at least one feature dimension for each entity, and at least one feature value for each feature dimension;
   a cache memory for storing data;
   at least one processor in communication with the at least one storage medium and the cache memory; wherein when executing the set of instructions, the at least one processor is configured to direct the system to:
      determine a characteristic value of a selected feature dimension among the feature values of the selected feature dimension of the plurality of entities and establish a corresponding relationship between the characteristic value and the selected feature dimension;
      for each entity having a feature value of the selected feature dimension being unequal to the characteristic value, cache the corresponding feature value of the selected feature dimension into the cache memory;
      for each entity having a feature value of the selected feature dimension being equal to the characteristic value, leave the corresponding feature value of the selected feature dimension without caching;

in response to a query request related to the plurality of entities, perform a first search in the cache memory to produce a first search result; and generate a query result based on the corresponding relationship and the first search result.

2. The system of claim 1, wherein to determine the characteristic value of the selected feature dimension, the at least one processor is further configured to direct the system to:

determine a mode of the feature values of the selected feature dimension of plurality of entities as the characteristic value of the selected feature dimension.

3. The system of claim 1, the at least one processor is further configured to direct the system to:

update the feature information of the plurality of entities in the at least one storage medium; and determine an updated characteristic value of the selected feature dimension based on the updated feature information.

4. The system of claim 1, wherein to generate the query result, the at least one processor is further configured to direct the system to:

replace one or more empty returns for the selected feature dimension in the first search result with the characteristic value.

5. The system of claim 1, wherein to generate the query result, the at least one processor is further configured to direct the system to:

determine whether the first search result includes an empty return;

in response to a determination that the first search result includes an empty return, cache the characteristic value of the selected feature dimension into the cache memory based on the corresponding relationship for each entity whose selected feature dimension having an empty entry;

perform a second search in the cache memory in response to the query request to produce a second search result; and generate the query result based on the second search result.

6. The system of claim 1, wherein to perform the first search in the cache memory in response to the query request, the at least one processor is further configured to direct the system to:

determine whether the query request is related to the selected feature dimension and the corresponding characteristic value;

in response to a determination that the query request is related to the selected feature dimension and the corresponding characteristic value, update the query request, the updated query request including the feature dimension and an empty entry; and perform the first search in the cache memory based on the updated query request.

7. The system of claim 1, wherein to perform the first search in the cache memory in response to the query request, the at least one processor is further configured to direct the system to:

determine whether the query request is related to the selected feature dimension;

in response to a determination that the query request is related to the selected feature dimension, cache the characteristic value of the selected feature dimension into the cache memory for each entity whose selected feature dimension has an empty entry; and perform the first search in the cache memory in response to the query request.

8. The system of claim 1, wherein to perform the first search in the cache memory in response to the query request, the at least one processor is further configured to direct the system to:

in response to the query request, cache the characteristic value of the selected feature dimension into the cache memory for each entity whose selected feature dimension has an empty entry; and perform the first search in the cache memory.

9. The system of claim 1, wherein the plurality of entities includes at least one of service requesters, service providers, or service orders in an Online to Offline (O2O) service system.

10. A method implemented on a computing device having at least one processor, at least one storage medium, a cache memory, and a communication platform connected to a network, the at least one storage medium including feature information of a plurality of entities, the feature information including at least one feature dimension for each entity, and at least one feature value for each feature dimension, the method comprising:

determine a characteristic value of a selected feature dimension among the feature values of the selected feature dimension of the plurality of entities and establish a corresponding relationship between the characteristic value and the selected feature dimension;

for each entity having a feature value of the selected feature dimension being unequal to the characteristic value, caching the corresponding feature value of the selected feature dimension into the cache memory;

for each entity having a feature value of the selected feature dimension being equal to the characteristic value, leaving the corresponding feature value of the selected feature dimension without caching;

in response to a query request related to the plurality of entities, performing a first search in the cache memory to produce a first search result; and generating a query result based on the corresponding relationship and the first search result.

11. The method of claim 10, wherein determining the characteristic value of the selected feature dimension comprises:

determining a mode of the feature values of the selected feature dimension of plurality of entities as the characteristic value of the selected feature dimension.

12. The method of claim 10, further comprising:

updating the feature information of the plurality of entities in the at least one storage medium; and determining an updated characteristic value of the selected feature dimension based on the updated feature information.

13. The method of claim 10, wherein generating the query result comprises:

replacing one or more empty returns for the selected feature dimension in the first search result with the characteristic value.

14. The method of claim 10, wherein generating the query result further comprises:

determining whether the first search result includes an empty return;

in response to a determination that the first search result includes an empty return, caching the characteristic value of the selected feature dimension into the cache memory based on the corresponding relationship for each entity whose selected feature dimension having an empty entry;

performing a second search in the cache memory in response to the query request to produce a second search result; and generating the query result based on the second search result.

15. The method of claim 10, wherein performing the first search in the cache memory in response to the query request comprises:

determining whether the query request is related to the selected feature dimension and the corresponding characteristic value;

in response to a determination that the query request is related to the selected feature dimension and the corresponding characteristic value, updating the query request, the updated query request including the feature dimension and an empty entry; and performing the first search in the cache memory based on the updated query request.

16. The method of claim 10, wherein performing the first search in the cache memory in response to the query request further comprises:

determining whether the query request is related to the selected feature dimension;

in response to a determination that the query request is related to the selected feature dimension, caching the characteristic value of the selected feature dimension into the cache memory for each entity whose selected feature dimension has an empty entry; and performing the first search in the cache memory in response to the query request.

17. The method of claim 10, wherein performing the first search in the cache memory in response to the query request further comprises:

in response to the query request, caching the characteristic value of the selected feature dimension into the cache memory for each entity whose selected feature dimension has an empty entry; and performing the first search in the cache memory.

18. The method of claim 10, wherein the plurality of entities includes at least one of service requesters, service providers, or service orders in an Online to Offline (O2O) service system.

19. A non-transitory computer-readable storage medium embodying a computer program product, the computer program product comprising instructions configured to cause a computing device to:

determine a characteristic value of a selected feature dimension among a plurality of feature values of the selected feature dimension of a plurality of entities and establish a corresponding relationship between the characteristic value and the selected feature dimension;

for each entity having a feature value of the selected feature dimension being unequal to the characteristic value, cache the corresponding feature value of the selected feature dimension into a cache memory;

for each entity having a feature value of the selected feature dimension being equal to the characteristic value, leave the corresponding feature value of the selected feature dimension without caching;

in response to a query request related to the plurality of entities, perform a first search in the cache memory to produce a first search result; and generate a query result based on the corresponding relationship and the first search result.

20. The non-transitory computer-readable storage medium of claim 19, wherein to determine the characteristic value of the selected feature dimension, the computer program product comprising instructions configured to cause the computing device to:

determine a mode of the feature values of the selected feature dimension of plurality of entities as the characteristic value of the selected feature dimension.

* * * * *